United States Patent
Park

(10) Patent No.: US 9,247,146 B2
(45) Date of Patent: Jan. 26, 2016

(54) MOBILE TERMINAL AND CONTROL METHOD THEREOF

(71) Applicant: LG ELECTRONICS INC., Seoul (KR)

(72) Inventor: Jongseok Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/289,418

(22) Filed: May 28, 2014

(65) Prior Publication Data

US 2014/0253779 A1   Sep. 11, 2014

Related U.S. Application Data

(63) Continuation of application No. 13/963,667, filed on Aug. 9, 2013, now Pat. No. 8,774,869, which is a continuation of application No. 13/659,839, filed on Oct. 24, 2012, now Pat. No. 8,532,596.

(30) Foreign Application Priority Data

May 21, 2012   (KR) .................. 10-2012-0053597

(51) Int. Cl.
| | | |
|---|---|---|
| *H04N 5/232* | (2006.01) | |
| *G06F 3/0481* | (2013.01) | |
| *G06F 3/0488* | (2013.01) | |
| *H04M 1/02* | (2006.01) | |
| *G06F 9/44* | (2006.01) | |
| *G06Q 10/10* | (2012.01) | |
| *G06F 17/24* | (2006.01) | |

(52) U.S. Cl.
CPC .......... *H04N 5/23293* (2013.01); *G06F 3/0481* (2013.01); *G06F 3/04883* (2013.01); *G06F 9/4443* (2013.01); *G06F 17/241* (2013.01); *G06Q 10/10* (2013.01); *H04M 1/0266* (2013.01); *G06F 2203/04804* (2013.01)

(58) Field of Classification Search
CPC . G06F 3/0481; G06F 3/04883; G06F 9/4443; G06Q 10/10; H04M 1/0266; H04N 5/23293
See application file for complete search history.

(56) References Cited

U.S. PATENT DOCUMENTS

| | | | |
|---|---|---|---|
| 5,528,259 A | 6/1996 | Bates et al. | |
| 6,339,431 B1 * | 1/2002 | Ohmori et al. | ................ 345/619 |
| 6,567,120 B1 * | 5/2003 | Hamamura et al. | ..... 348/207.99 |
| 7,233,356 B2 * | 6/2007 | Nagao | ....................... 348/333.02 |
| 8,301,995 B2 * | 10/2012 | Pozniansky et al. | .......... 715/230 |
| 2003/0216152 A1 | 11/2003 | Fukagawa | |
| 2004/0093432 A1 * | 5/2004 | Luo et al. | ...................... 709/247 |

(Continued)

FOREIGN PATENT DOCUMENTS

| | | |
|---|---|---|
| CN | 101893984 A | 11/2010 |
| CN | 102460359 A | 5/2012 |

(Continued)

*Primary Examiner* — Kashif Siddiqui

(74) *Attorney, Agent, or Firm* — Birch, Stewart, Kolasch & Birch, LLP

(57) ABSTRACT

A mobile terminal including a touch screen; a camera configured to acquire an image; and a controller configured to: display the acquired image on the touch screen; enable a note function on the touch screen while the acquired image is displayed; receive a touch input for performing the note function on the image, a touch trajectory corresponding to the touch input being displayed on the image as a note; and store the note on the acquired image in a memory of the mobile terminal.

11 Claims, 49 Drawing Sheets

(56) References Cited

U.S. PATENT DOCUMENTS

| | | |
|---|---|---|
| 2005/0091578 A1* | 4/2005 | Madan et al. ............... 715/512 |
| 2005/0101314 A1 | 5/2005 | Levi |
| 2007/0161382 A1 | 7/2007 | Melinger et al. |
| 2008/0046837 A1 | 2/2008 | Beauchamp et al. |
| 2008/0109464 A1 | 5/2008 | Ozzie et al. |
| 2008/0119235 A1* | 5/2008 | Nielsen et al. ............. 455/566 |
| 2008/0174568 A1 | 7/2008 | Kim |
| 2009/0007061 A1 | 1/2009 | Ben-Zvi et al. |
| 2009/0325647 A1 | 12/2009 | Cho et al. |
| 2010/0077291 A1 | 3/2010 | Takahashi et al. |
| 2010/0299635 A1 | 11/2010 | Oh et al. |
| 2010/0306705 A1 | 12/2010 | Nilsson |
| 2011/0069073 A1 | 3/2011 | Unger |
| 2011/0289401 A1 | 11/2011 | Fischer |
| 2012/0064947 A1 | 3/2012 | Yi et al. |
| 2012/0100876 A1 | 4/2012 | Anderson et al. |
| 2012/0198386 A1 | 8/2012 | Hautala |
| 2013/0342729 A1* | 12/2013 | Kim et al. ............... 348/231.3 |

FOREIGN PATENT DOCUMENTS

| | | |
|---|---|---|
| EP | 1091278 A2 | 4/2001 |
| JP | 2009-211449 A | 9/2009 |
| KR | 10-0403127 B1 | 10/2003 |
| KR | 10-2010-0063545 A1 | 6/2010 |
| KR | 10-2010-0117439 A | 11/2010 |
| KR | 10-2012-0005153 A | 1/2012 |
| RU | 2004131025 A | 4/2006 |

* cited by examiner (a)

| Body | Tag |
|------|-----|

(b)

| Information | |
|---|---|
| Date | 2012.05.18 03:03:15 |
| Shutter | 1/60 |
| F-STOP | f/6.3 |
| ISO | 800 |
| Tag | suji |

OK (a)

(b)

(c)

MOBILE TERMINAL AND CONTROL METHOD THEREOF

CROSS-REFERENCE TO RELATED APPLICATIONS

This application is a Continuation of U.S. patent application Ser. No. 13/963,667 filed on Aug. 9, 2013, which is a Continuation of U.S. patent application Ser. No. 13/659,839, filed on Oct. 24, 2012 (now U.S. Pat. No. 8,532,596, issued Sep. 10, 2013) which claims the benefit of Korean Patent Application No. 10-2012-0053597, filed in the Republic of Korea on May 21, 2012, the entire contents of all of the above applications are hereby incorporated by reference.

BACKGROUND OF THE INVENTION

1. Technical Field of the Invention

The present invention relates to a mobile terminal, and more particularly, to a mobile terminal and a control method thereof for displaying a touch trajectory corresponding to a touch input of a user regardless of screen change.

2. Discussion of the Related Art

As functions of terminals such as personal computers, laptop computers, cellular phones diversify, the terminals become multimedia players having multiple functions for capturing pictures or moving images, playing music, moving image files and games and receiving broadcasting programs.

Terminals can be categorized as mobile terminals and stationary terminals. The mobile terminals can be further comprised of handheld terminals and vehicle mount terminals according to whether users can personally carry the terminals. Conventional terminals including mobile terminals provide an increasing number of complex and various functions.

To support and enhance the increasing number of functions in a terminal, improving a structural part and/or a software part of the terminal would be desirable.

Furthermore, there is an increasing user's demand for a prompt note function.

SUMMARY OF THE INVENTION

The present invention provides a mobile terminal and a control method thereof for displaying a touch trajectory corresponding to a touch input of a user regardless of screen change.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

FIGS. 41 to 47 illustrate a case in which the note function is used while an image is captured.

DETAILED DESCRIPTION OF THE PRESENT INVENTION

Arrangements and embodiments may now be described more fully with reference to the accompanying drawings, in which exemplary embodiments may be shown. Embodiments may, however, be embodied in many different forms and should not be construed as being limited to embodiments set forth herein; rather, embodiments may be provided so that this disclosure will be thorough and complete, and will fully convey the concept to those skilled in the art.

A mobile terminal may be described below with reference to the accompanying drawings. In the following description, suffixes "module" and "unit" may be given to components of the mobile terminal in consideration of only facilitation of description and do not have meanings or functions discriminated from each other.

The mobile terminal may include a cellular phone, a smart phone, a laptop computer, a digital broadcasting terminal, personal digital assistants (PDA), a portable multimedia player (PMP), a navigation system and/or so on.

Figure 1:
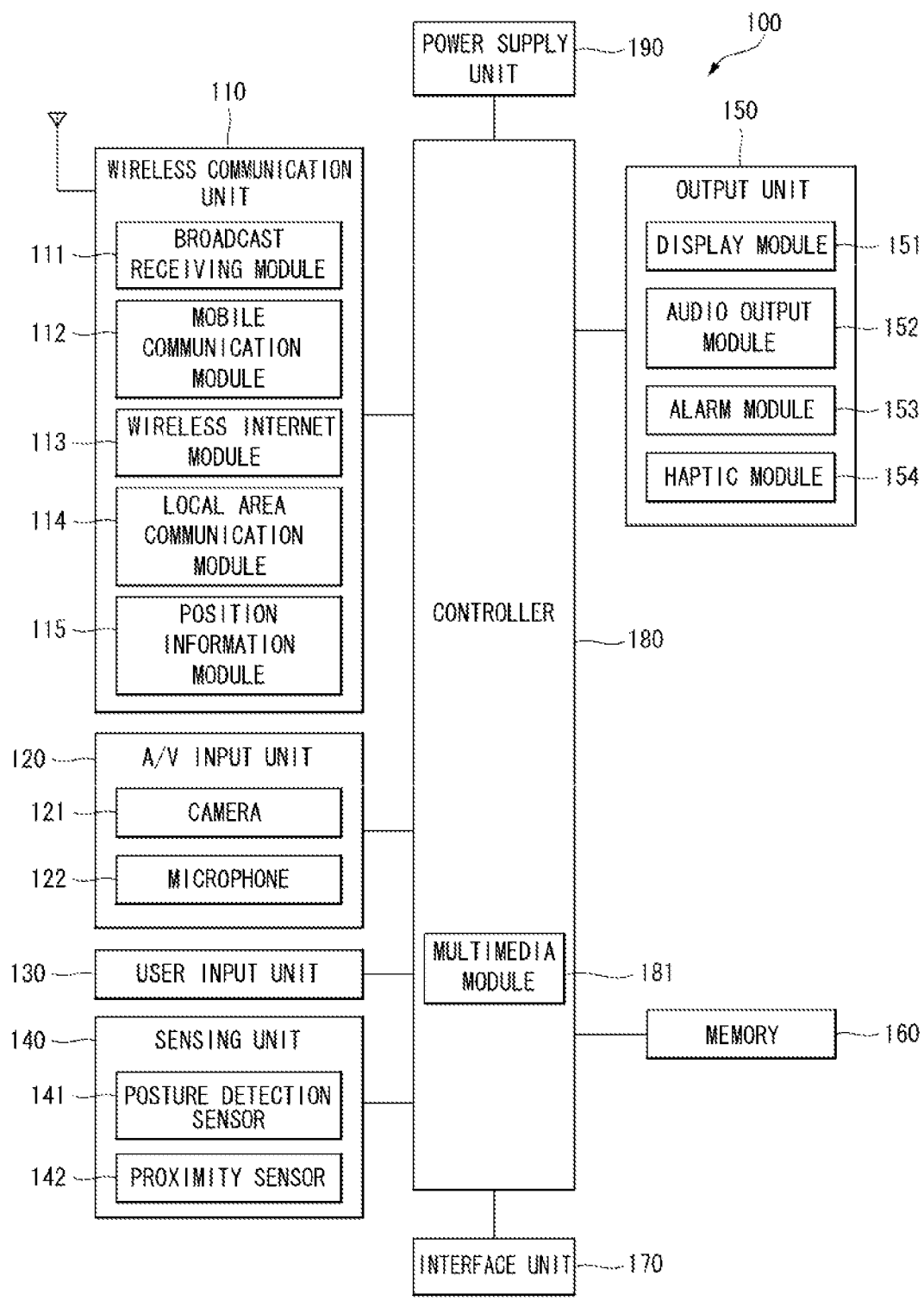
FIG. 1 is a block diagram of a mobile terminal according to an embodiment.

FIG. 1 is a block diagram of a mobile terminal according to an embodiment. Other embodiments, configurations and arrangements may also be provided.

As shown, the mobile terminal 100 may include a wireless communication unit 110 (or radio communication unit), an audio/video (A/V) input unit 120, a user input unit 130, a sensing unit 140, an output unit 150, a memory 160, an interface 170, a controller 180, and a power supply 190. The components shown in FIG. 1 may be essential parts and/or a number of components included in the mobile terminal 100 may vary. Components of the mobile terminal 100 may now be described.

The wireless communication unit 110 may include at least one module that enables radio communication between the mobile terminal 100 and a radio communication system or between the mobile terminal 100 and a network in which the mobile terminal 100 is located. For example, the wireless communication unit 110 may include a broadcasting receiving module 111, a mobile communication module 112, a wireless Internet module 113, a short range communication module 114 (or local area communication module), and a location information module 115 (or position information module).

The broadcasting receiving module 111 may receive broadcasting signals and/or broadcasting related information from an external broadcasting management server through a broadcasting channel. The broadcasting channel may include a satellite channel and a terrestrial channel, and the broadcasting management server may be a server that generates and transmits broadcasting signals and/or broadcasting related information or a server that receives previously created broadcasting signals and/or broadcasting related information and transmits the broadcasting signals and/or broadcasting related information to a terminal.

The broadcasting signals may include not only TV broadcasting signals, radio broadcasting signals, and data broadcasting signals but also signals in the form of a combination of a TV broadcasting signal and a radio broadcasting signal. The broadcasting related information may be information on a broadcasting channel, a broadcasting program or a broadcasting service provider, and may be provided even through a mobile communication network. In the latter case, the broadcasting related information may be received by the mobile communication module 112.

The broadcasting related information may exist in various forms. For example, the broadcasting related information may exist in the form of an electronic program guide (EPG) of a digital multimedia broadcasting (DMB) system or in the form of an electronic service guide (ESG) of a digital video broadcast-handheld (DVB-H) system.

The broadcasting receiving module 111 may receive broadcasting signals using various broadcasting systems. More particularly, the broadcasting receiving module 111 may receive digital broadcasting signals using digital broadcasting systems such as a digital multimedia broadcasting-terrestrial (DMB-T) system, a digital multimedia broadcasting-satellite (DMB-S) system, a media forward link only (MediaFLO) system, a DVB-H and integrated services digital broadcast-terrestrial (ISDB-T) systems. The broadcasting receiving module 111 may receive signals from broadcasting systems providing broadcasting signals other than the above-described digital broadcasting systems.

The broadcasting signals and/or broadcasting related information received through the broadcasting receiving module 111 may be stored in the memory 160. The mobile communication module 112 may transmit/receive a radio signal to/from at least one of a base station, an external terminal and a server on a mobile communication network. The radio signal may include a voice call signal, a video telephony call signal or data in various forms according to transmission and reception of text/multimedia messages.

The wireless Internet module 113 may correspond to a module for wireless Internet access and may be included in the mobile terminal 100 or may be externally attached to the mobile terminal 100. Wireless LAN (WLAN or Wi-Fi), wireless broadband (Wibro), world interoperability for microwave access (Wimax), high speed downlink packet access (HSDPA) and so on may be used as a wireless Internet technique.

The short range communication module 114 may correspond to a module for short range communication. Further, Bluetooth®, radio frequency identification (RFID), infrared data association (IrDA), ultra wideband (UWB) and/or Zig-Bee® may be used as a short range communication technique.

The location information module 115 may confirm or obtain a location or a position of the mobile terminal 100. The location information module 115 may obtain position information by using a global navigation satellite system (GNSS). The GNSS is a terminology describing a radio navigation satellite system that revolves around the earth and transmits reference signals to predetermined types of radio navigation receivers such that the radio navigation receivers can determine their positions on the earth's surface or near the earth's surface. The GNSS may include a global positioning system (GPS) of the United States, Galileo of Europe, a global orbiting navigational satellite system (GLONASS) of Russia, COMPASS of China, and a quasi-zenith satellite system (QZSS) of Japan, for example.

A global positioning system (GPS) module is a representative example of the location information module 115. The GPS module may calculate information on distances between one point or object and at least three satellites and information on a time when distance information is measured and apply trigonometry to the obtained distance information to obtain three-dimensional position information on the point or object according to latitude, longitude and altitude at a predetermined time.

A method of calculating position and time information using three satellites and correcting the calculated position and time information using another satellite may also be used. Additionally, the GPS module may continuously calculate a current position in real time and calculate velocity information using the location or position information.

The A/V input unit 120 may input (or receive) an audio signal and/or a video signal. The A/V input unit 120 may include a camera 121 and a microphone 122. The camera 121 may process image frames of still images or moving images obtained by an image sensor in a video telephony mode or a photographing mode. The processed image frames may be displayed on a display 151, which may be a touch screen.

The image frames processed by the camera 121 may be stored in the memory 160 or may be transmitted to an external device through the wireless communication unit 110. The mobile terminal 100 may also include at least two cameras 121.

The microphone 122 may receive an external audio signal in a call mode, a recording mode and/or a speech recognition mode, and the microphone 122 may process the received audio signal into electric audio data. The audio data may then be converted into a form that can be transmitted to a mobile communication base station through the mobile communication module 112 and output in the call mode. The microphone 122 may employ various noise removal algorithms (or noise canceling algorithm) for removing or reducing noise generated when the external audio signal is received.

The user input unit 130 may receive input data for controlling operation of the mobile terminal 100 from a user. The user input unit 130 may include a keypad, a dome switch, a touch pad (constant voltage/capacitance), a jog wheel, a jog switch and/or so on.

The sensing unit 140 may sense a current state of the mobile terminal 100, such as an open/close state of the mobile terminal 100, a position of the mobile terminal 100, whether a user touches the mobile terminal 100, a direction of the mobile terminal 100, and acceleration/deceleration of the mobile terminal 100, and the sensing unit 140 may generate a sensing signal for controlling operation of the mobile terminal 100. For example, in an example of a slide phone, the sensing unit 140 may sense whether the slide phone is opened or closed. Further, the sensing unit 140 may sense whether the power supply 190 supplies power and/or whether the interface 170 is connected to an external device. The sensing unit 140 may also include a proximity sensor 141. The sensing unit 140 may sense a motion of the mobile terminal 100.

The output unit 150 may generate visual, auditory and/or tactile output, and the output unit 150 may include the display 151, an audio output module 152, an alarm 153 and a haptic module 154. The display 151 may display information processed by the mobile terminal 100. The display 151 may display a user interface (UI) and/or a graphic user interface (GUI) related to a telephone call when the mobile terminal 100 is in the call mode. The display 151 may also display a captured and/or received image, a UI or a GUI when the mobile terminal 100 is in the video telephony mode or the photographing mode.

The display 151 may include at least one of a liquid crystal display, a thin film transistor liquid crystal display, an organic light-emitting diode display, a flexible display and/or a three-dimensional display. The display 151 may be of a transparent type or a light transmissive type. That is, the display 151 may include a transparent display.

The transparent display may be a transparent liquid crystal display. A rear structure of the display 151 may also be of a light transmissive type. Accordingly, a user may see an object located behind the body (of the mobile terminal 100) through the transparent area of the body of the mobile terminal 100 that is occupied by the display 151.

The mobile terminal 100 may also include at least two displays 151. For example, the mobile terminal 100 may include a plurality of displays 151 that are arranged on a single face at a predetermined distance or integrated displays. The plurality of displays 151 may also be arranged on different sides.

When the display 151 and a sensor sensing touch (hereafter referred to as a touch sensor) form a layered structure that is referred to as a touch screen, the display 151 may be used as an input device in addition to an output device. The touch sensor may be in the form of a touch film, a touch sheet, and/or a touch pad, for example.

The touch sensor may convert a variation in pressure applied to a specific portion of the display 151 or a variation in capacitance generated at a specific portion of the display 151 into an electric input signal. The touch sensor may sense pressure of touch as well as position and area of the touch.

When the user applies a touch input to the touch sensor, a signal corresponding to the touch input may be transmitted to a touch controller. The touch controller may then process the signal and transmit data corresponding to the processed signal to the controller 180. Accordingly, the controller 180 may detect a touched portion of the display 151.

The proximity sensor 141 (of the sensing unit 140) may be located in an internal region of the mobile terminal 100, surrounded by the touch screen, and/or near the touch screen. The proximity sensor 141 may sense an object approaching a predetermined sensing face or an object located near the proximity sensor 141 using an electromagnetic force or infrared rays without having mechanical contact. The proximity sensor 141 may have a lifetime longer than a contact sensor and may thus have a wide application in the mobile terminal 100.

The proximity sensor 141 may include a transmission type photo-electric sensor, a direct reflection type photo-electric sensor, a mirror reflection type photo-electric sensor, a high-frequency oscillating proximity sensor, a capacitive proximity sensor, a magnetic proximity sensor, and/or an infrared proximity sensor. A capacitive touch screen may be constructed such that proximity of a pointer is detected through a variation in an electric field according to the proximity of the pointer. The touch screen (touch sensor) may be classified as a proximity sensor 141.

For ease of explanation, an action of the pointer approaching the touch screen without actually touching the touch screen may be referred to as a proximity touch and an action of bringing the pointer into contact with the touch screen may be referred to as a contact touch. The proximity touch point of the pointer on the touch screen may correspond to a point of the touch screen at which the pointer is perpendicular to the touch screen.

The proximity sensor 141 may sense the proximity touch and a proximity touch pattern (e.g., a proximity touch distance, a proximity touch direction, a proximity touch velocity, a proximity touch time, a proximity touch position, a proximity touch moving state, etc.). Information corresponding to the sensed proximity touch action and proximity touch pattern may then be displayed on the touch screen.

The audio output module 152 may output audio data received from the wireless communication unit 110 or stored in the memory 160 in a call signal receiving mode, a telephone call mode or a recording mode, a speech recognition mode and a broadcasting receiving mode. The audio output module 152 may output audio signals related to functions, such as a call signal incoming tone and a message incoming tone, performed in the mobile terminal 100. The audio output module 152 may include a receiver, a speaker, a buzzer, and/or the like. The audio output module 152 may output sounds through an earphone jack. The user may hear the sounds by connecting an earphone to the earphone jack.

The alarm 153 may output a signal for indicating generation of an event of the mobile terminal 100. For example, an alarm may be generated when receiving a call signal, receiving a message, inputting a key signal, and/or inputting a touch. The alarm 153 may also output signals in forms different from video signals or audio signals, for example, a signal for indicating generation of an event through vibration. The video signals and/or the audio signals may also be output through the display 151 or the audio output module 152.

The haptic module 154 may generate various haptic effects that the user can feel. One example of the haptic effects is vibration. An intensity and/or pattern of vibration generated by the haptic module 154 may also be controlled. For example, different vibrations may be combined and output or may be sequentially output.

The haptic module 154 may generate a variety of haptic effects including an effect of stimulus according to an arrangement of pins vertically moving against a contact skin surface, an effect of stimulus according to a jet force or sucking force of air through a jet hole or a sucking hole, an effect of stimulus of rubbing the skin, an effect of stimulus according to contact of an electrode, an effect of stimulus using an electrostatic force, and an effect according to a reproduction of cold and warmth using an element capable of absorbing or radiating heat in addition to vibrations.

The haptic module 154 may not only transmit haptic effects through direct contact but may also allow the user to feel haptic effects through a kinesthetic sense of the user's fingers or arms. The mobile terminal 100 may also include a plurality of haptic modules 154.

The memory 160 may store a program for operations of the controller 180 and/or temporarily store input/output data such as a phone book, messages, still images, and/or moving images. The memory 160 may also store data about vibrations and sounds in various patterns that are output from when a touch input is applied to the touch screen.

The memory 160 may include at least a flash memory, a hard disk type memory, a multimedia card micro type memory, a card type memory, such as SD or XD memory, a random access memory (RAM), a static RAM (SRAM), a read-only memory (ROM), an electrically erasable programmable ROM (EEPROM), a programmable ROM (PROM) magnetic memory, a magnetic disk and/or an optical disk. The mobile terminal 100 may also operate in relation to a web storage that performs a storing function of the memory 160 on the Internet.

The interface 170 may serve as a path to external devices connected to the mobile terminal 100. The interface 170 may receive data from the external devices or power and transmit the data or power to internal components of the mobile terminal 100 or transmit data of the mobile terminal 100 to the external devices. For example, the interface 170 may include a wired/wireless headset port, an external charger port, a wired/wireless data port, a memory card port, a port for connecting a device having a user identification module, an audio I/O port, a video I/O port, and/or an earphone port.

The interface 170 may also interface with a user identification module that is a chip that stores information for authenticating authority to use the mobile terminal 100. For example, the user identification module may be a user identify module (UIM), a subscriber identify module (SIM) and/or a universal subscriber identity module (USIM). An identification device (including the user identification module) may also be manufactured in the form of a smart card. Accordingly, the identification device may be connected to the mobile terminal 100 through a port of the interface 170.

The interface 170 may also be a path through which power from an external cradle is provided to the mobile terminal 100 when the mobile terminal 100 is connected to the external cradle or a path through which various command signals input by the user through the cradle are transmitted to the mobile terminal 100. The various command signals or power input from the cradle may be used as signals for confirming whether the mobile terminal 100 is correctly set in the cradle.

The controller 180 may control overall operations of the mobile terminal 100. For example, the controller 180 may perform control and processing for voice communication, data communication and/or video telephony. The controller 180 may also include a multimedia module 181 for playing multimedia. The multimedia module 181 may be included in the controller 180 or may be separated from the controller 180.

The controller 180 may perform a pattern recognition process capable of recognizing handwriting input or picture-drawing input applied to the touch screen as characters or images. The power supply 190 may receive external power and internal power and provide power required for operations of the components of the mobile terminal 100 under control of the controller 180.

According to hardware implementation, embodiments may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and/or electrical units for executing functions. Embodiments may be implemented by the controller 180.

According to software implementation, embodiments such as procedures or functions may be implemented with a separate software module that executes at least one function or operation. Software codes may be implemented according to a software application written in an appropriate software language. The software codes may be stored in the memory 160 and executed by the controller 180.

Figure 2A:
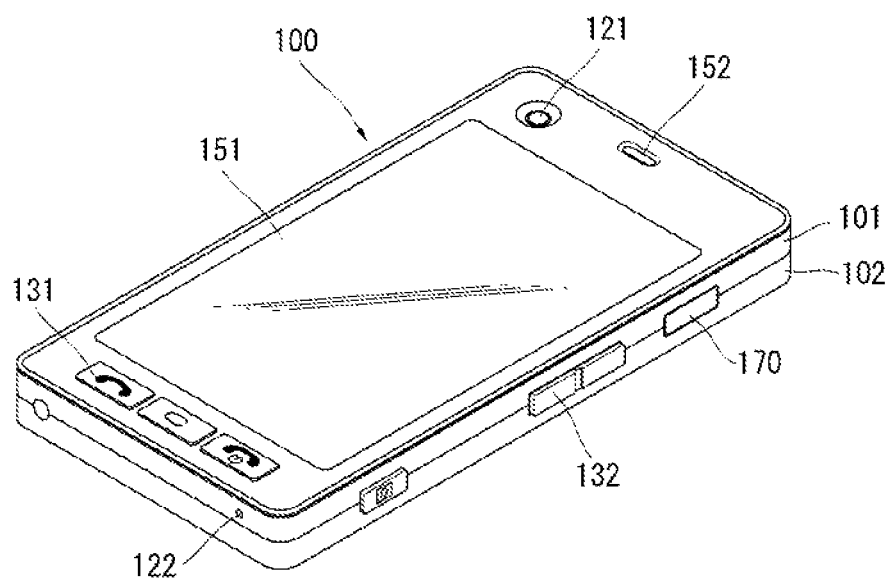
FIG. 2A is a front perspective view of the mobile terminal according to an embodiment.

FIG. 2A is a front perspective view of a mobile terminal (or a handheld terminal) according to an embodiment.

The mobile terminal 100 may be a bar type terminal body. However, embodiments are not limited to a bar type terminal and may be applied to terminals of various types including slide type, folder type, swing type and/or swivel type terminals having at least two bodies that are relatively movably combined.

The terminal body may include a case (a casing, a housing, a cover, etc.) that forms an exterior of the mobile terminal 100. In this embodiment, the case may be divided into a front case 101 and a rear case 102. Various electronic components may be arranged in the space formed between the front case 101 and the rear case 102. At least one middle case may be additionally provided between the front case 101 and the rear case 102.

The cases may be formed of plastics through injection molding or made of a metal material such as stainless steel (STS) or titanium (Ti).

The display 151, the audio output unit 152, the camera 121, the user input unit 130/131 and 132, the microphone 122 and the interface 170 may be arranged (or provided) in the terminal body, and more specifically may be arranged (or provided) in the front case 101.

The display 151 may occupy most of the main face of the front case 101. The audio output unit 152 and the camera 121 may be arranged in a region in proximity to one of both ends of the display 151 and the user input unit 131, and the microphone 122 may be located in a region in proximity to another end of the display 151. The user input unit 132 and the interface 170 may be arranged (or provided) on sides of the front case 101 and the rear case 102.

The user input unit 130 may receive commands for controlling operation of the mobile terminal 100, and may include a plurality of operating units 131 and 132. The operating units 131 and 132 may be referred to as manipulating portions and may employ any tactile manner in which a user operates the operating units 131 and 132 while having tactile feeling.

The first and second operating units 131 and 132 may receive various inputs. For example, the first operating unit 131 may receive commands such as start, end and scroll and the second operating unit 132 may receive commands such as control of a volume of sound output from the audio output unit 152 or conversion of the display 151 to a touch recognition mode.

Figure 2B:
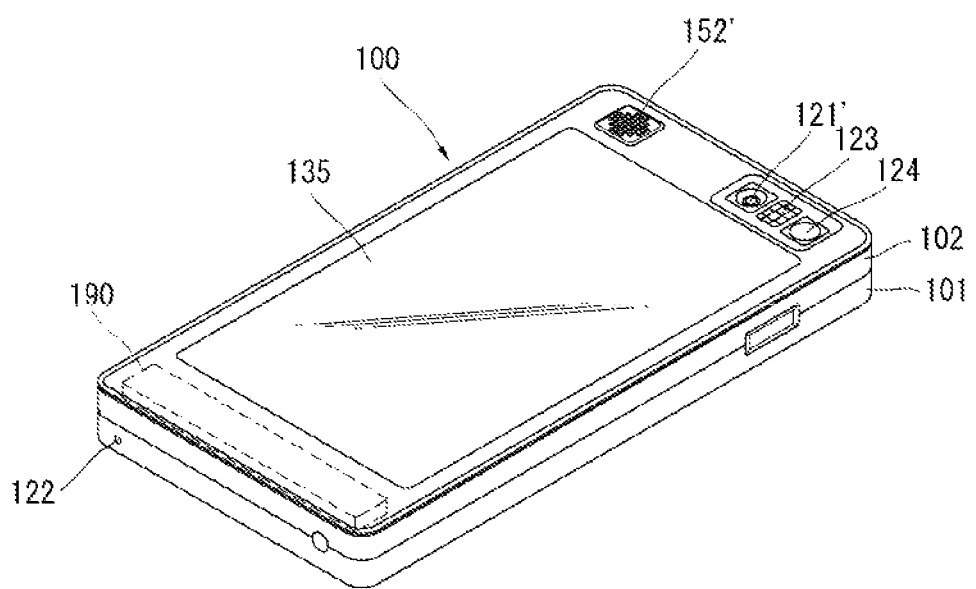
FIG. 2B is a rear perspective view of the mobile terminal according to an embodiment.

FIG. 2B is a rear perspective view of the mobile terminal (shown in FIG. 2A) according to an embodiment.

Referring to FIG. 2A, a camera 121' may be additionally attached to the rear side of the terminal body (i.e., the rear case 102). The camera 121' may have a photographing direction opposite to that of the camera 121 (shown in FIG. 2A) and may have pixels different from those of the camera 121 (shown in FIG. 2A).

For example, it may be desirable that the camera 121 has low pixels such that the camera 121 may capture an image of a face of a user and transmit the image to a receiving part in case of video telephony while the camera 121' has high pixels because the camera 121' captures an image of a general object and does not immediately transmit the image in many cases. The cameras 121 and 121' may be attached (or provided) to the terminal body such that the cameras 121 and 121' may rotate or pop-up.

A flash bulb 123 and a mirror 124 may be additionally provided in proximity to the camera 121'. The flash bulb 123 may light an object when the camera 121' takes a picture of the object. The mirror 124 may be used for the user to look at his/her face in the mirror when the user wants to self-photograph himself/herself using the camera 121'.

An audio output unit 152' may be additionally provided on the rear side of the terminal body. The audio output unit 152' may achieve a stereo function with the audio output unit 152

(shown in FIG. 2A) and may be used for a speaker phone mode when the terminal is used for a telephone call.

A broadcasting signal receiving antenna may be additionally attached (or provided) to the side of the terminal body in addition to an antenna for telephone calls. The antenna constructing a part of the broadcasting receiving module 111 (shown in FIG. 1) may be set in the terminal body such that the antenna may be pulled out of the terminal body.

The power supply 190 for providing power to the mobile terminal 100 may be set in the terminal body. The power supply 190 may be included in the terminal body or may be detachably attached to the terminal body.

A touch pad 135 for sensing touch may be attached to the rear case 102. The touch pad 135 may be of a light transmission type, such as the display 151. In this example, if the display 151 outputs visual information through both sides thereof, the visual information may be recognized (or determined) by the touch pad 135. The information output through both sides of the display 151 may be controlled by the touch pad 135. Otherwise, a display may be additionally attached (or provided) to the touch pad 135 such that a touch screen may be arranged (or provided) even in the rear case 102.

The touch pad 135 may operate in connection with the display 151 of the front case 101. The touch pad 135 may be located in parallel with the display 151 behind the display 151. The touch panel 135 may be identical to or smaller than the display 151 in size.

Figure 3:
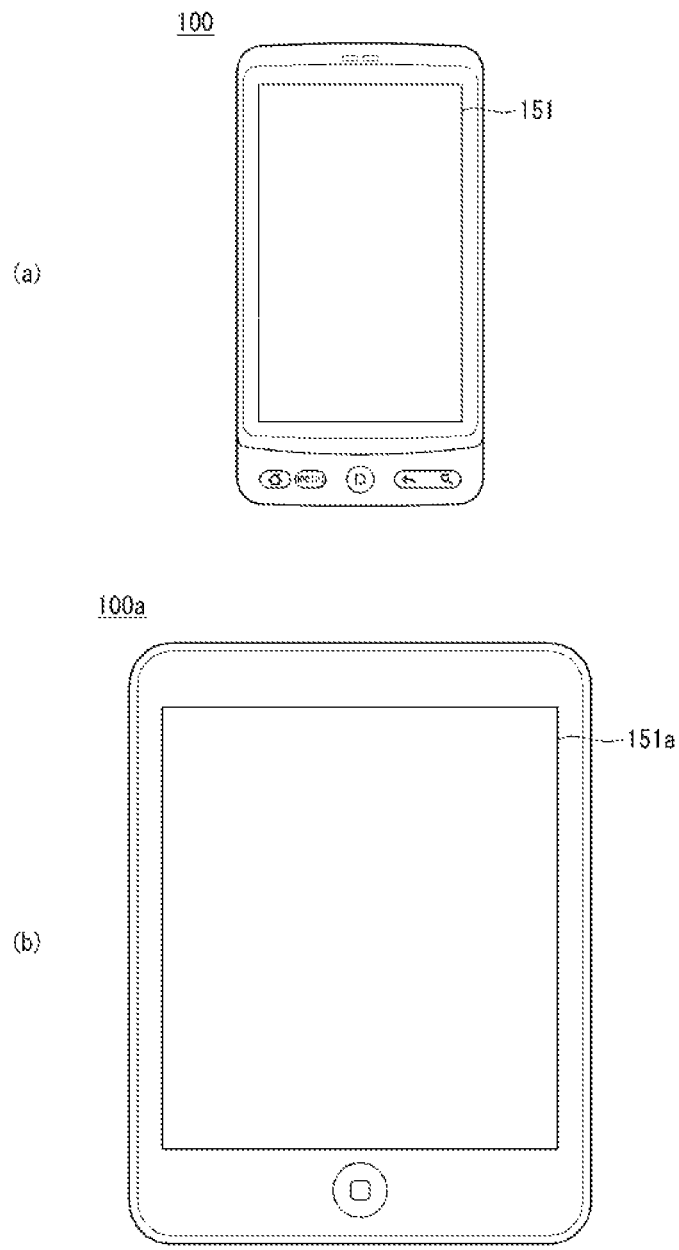
FIG. 3 shows exemplary mobile terminals according to embodiments of the present invention.

FIG. 3 shows exemplary mobile terminals according to embodiments of the present invention.

As shown in FIG. 3, the present invention can be applied to mobile terminals 100 and 100*a* in various forms.

Referring to FIG. 3(*a*), the mobile terminal 100 may include the display 151 having a conventional form. For example, the present invention can be applied to the mobile terminal 100 in a size such that the user can touch the display 151 with a hand gripping the mobile terminal 100.

Referring to FIG. 3(*b*), the mobile terminal 100*a* may include a large display 151*a*. For example, the present invention can be applied to the mobile terminal 100*a* in a size such that the user cannot touch the display 151*a* with a hand gripping the mobile terminal 100*a*.

Figure 4:
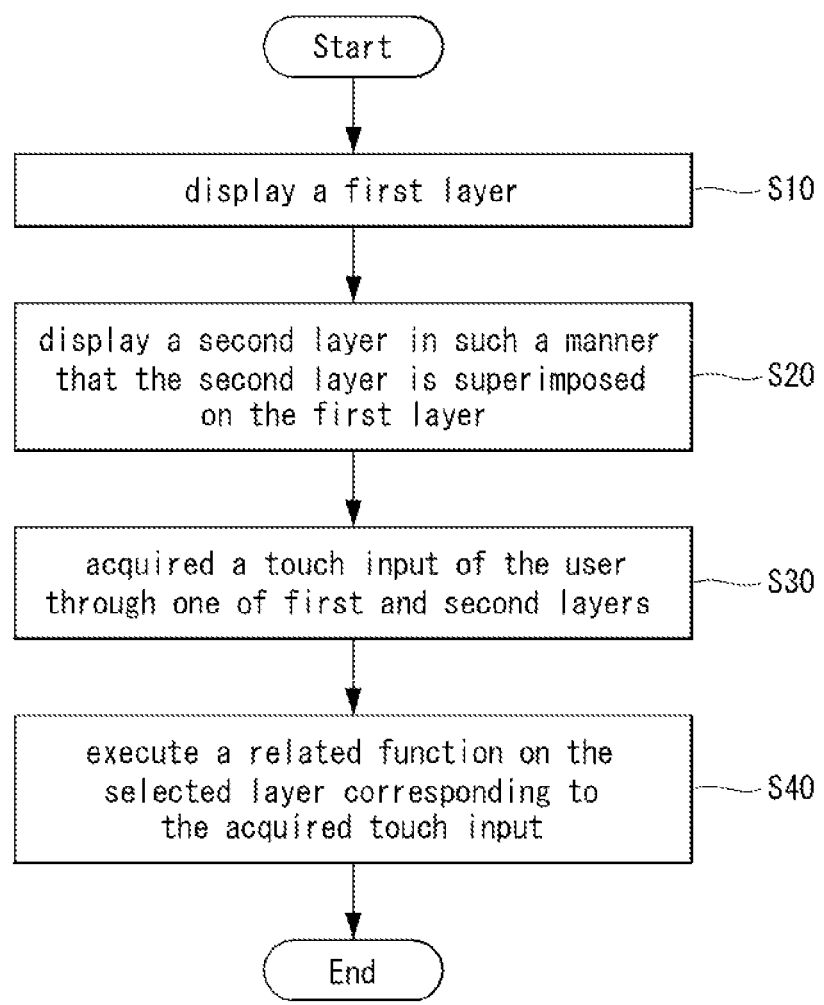
FIG. 4 is a flowchart illustrating operations of the mobile terminal shown in FIG. 1.

FIG. 4 is a flowchart illustrating operations of the mobile terminal shown in FIG. 1.

Referring to FIG. 4, the controller 180 of the mobile terminal 100 according to an embodiment of the present invention may display a first layer (S10).

The first layer may be an image displayed according to a conventional operation of the mobile terminal 100. For example, the first layer can be a back screen of the mobile terminal 100, which waits for user input, a screen on which a specific application is executed, etc. The first layer may be changed according to user operation. For example, when a specific icon is selected on the back screen to execute an application corresponding to the icon, the back screen is changed to a screen corresponding to the executed application.

A second layer may be displayed in such a manner that the second layer is superimposed on the first layer (S20).

The second layer may be a screen on which a note function according to an embodiment of the present invention is executed. That is, a touch trajectory corresponding to a user touch input can be displayed on the second layer as a note. For example, when the user touches the display 151, a trajectory corresponding to the touch can be displayed on the second layer.

The second layer may include the trajectory. For example, the first layer can include the back screen and the second layer can include the touch trajectory.

The first layer and the second layer may be displayed in a superimposed manner. For example, a layer for note input can be displayed on the previously displayed back screen. Accordingly, the second layer for note input can be displayed in a transparent or translucent manner such that the first layer is visible. That is, icons displayed on the first layer can be visually recognized even when the second layer is displayed on the first layer.

A touch input of the user may be acquired through one of first and second screens (S30), and a related function may be executed on the selected screen corresponding to the acquired touch input (S40).

The user may select a specific screen from the first and second screens. The specific screen may be a screen which can be operated by the user. For example, a touch input applied to the display 151 can be recognized as a note input to the second layer when the second layer is displayed. Accordingly, a touch trajectory corresponding to the touch input can be displayed on the display 151. When the first layer is selected, a touch input of the user can be applied to the first layer even when the second layer is superimposed on the first layer. Accordingly a back screen may be changed according to a touch operation.

One of the first and second screens may be selected according to a selection operation of the user and/or a control signal of the controller 180. For example, the user can select a specific icon displayed on the display 151 to apply a touch input of the user to the second screen on the first layer.

FIGS. 5 to 8 illustrate a note function display procedure of the mobile terminal of FIG. 1.

As shown in FIGS. 5 to 8, the controller 180 of the mobile terminal 100 can display the second layer S2 upon a touch input of the user, applied to the display 151.

Figure 5:
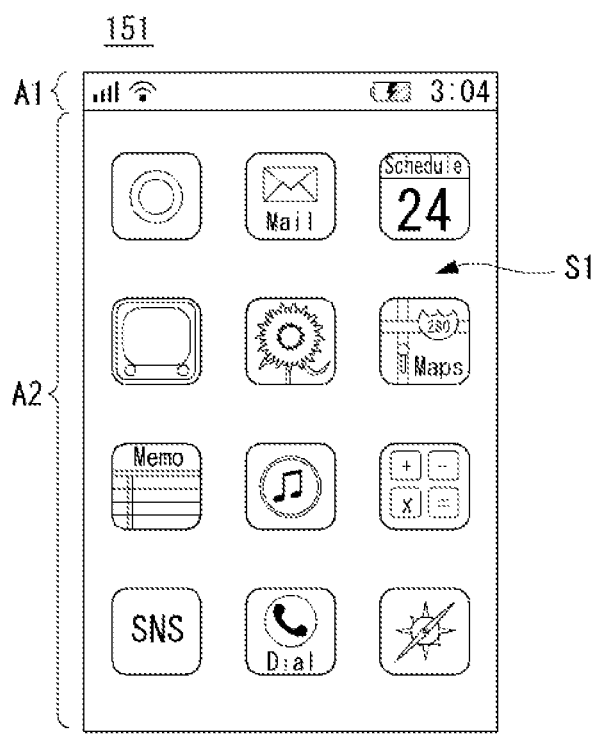
FIGS. 5 to 8 illustrate a note function display method of the mobile terminal of FIG. 1 according to an embodiment of the present invention.

Referring to FIG. 5, a back screen may be displayed on the display 151. The back screen display state may correspond to the state that the first layer is displayed. For example, indicators that indicate states of the mobile terminal 100, such as battery state, can be displayed in a first area A1 of the display 151 and icons can be displayed in a second area A2. While FIG. 5 shows the back screen on which the icons are displayed in the second area A2, a screen on which a specific application is executed may be displayed.

Figure 6:
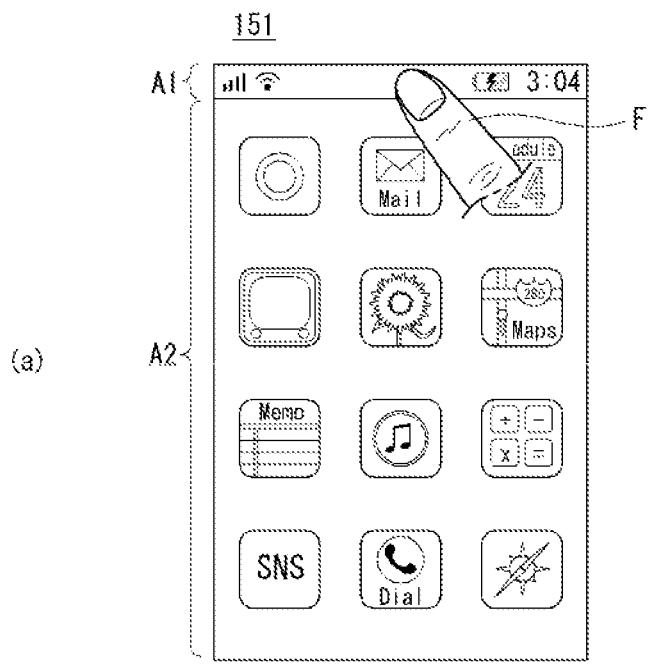
Figure 6:
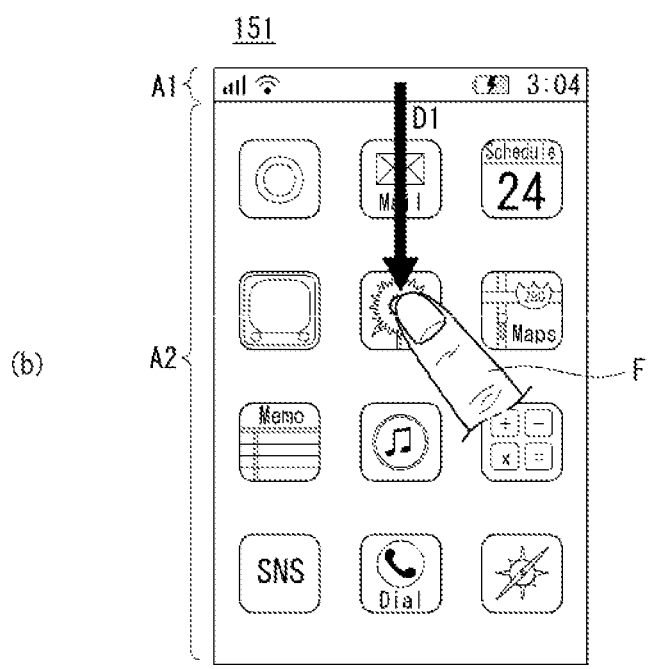

Referring to FIG. 6, the user may touch the first area A1 with a finger F and drag the touch to the second area A1 in a direction D1. While FIG. 6 shows that the display 151 is touched with the finger F, the display 151 may be touched using a stylus.

Figure 7:
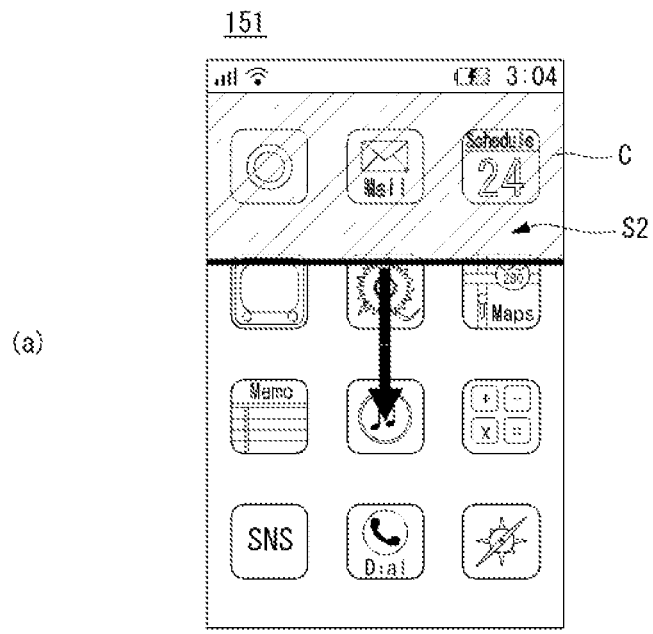
Figure 7:
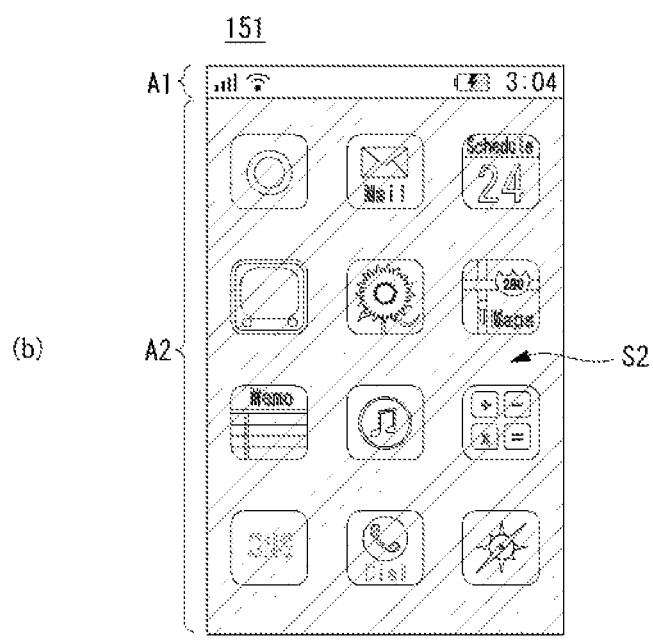

Referring to FIG. 7, upon a specific touch input of the user, the controller 180 can display the second layer S2. The second layer S2 can be displayed as if a curtain drops according to an animation effect. In the figures, the second layer S2 is hatched to represent that the second layer S2 is translucent. However, this is an exemplary representation indicating that the second layer S2 is enabled, and the second layer S2 may be transparent. That is, even if the second layer S2 is enabled to enable the note function, the display state of the display 151 may not change.

Figure 8:
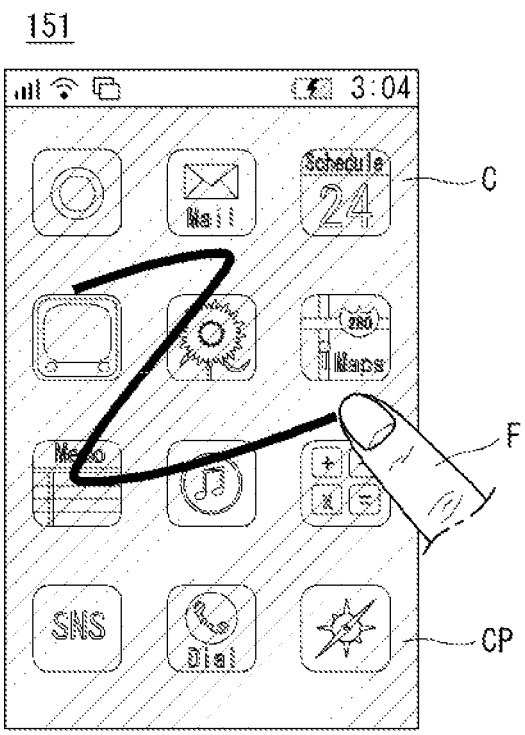

Referring to FIG. 8, upon activation of the second layer S2, the controller 180 can display a touch trajectory corresponding to a touch input of the user using the finger F. That is, the second layer S2 can be used for the note function of displaying a touch trajectory of the user applied to the display 151. Particularly, the second layer S2 can be used for quick memo because the note function can be used through the second layer according to a relatively simple operation.

Figure 9:
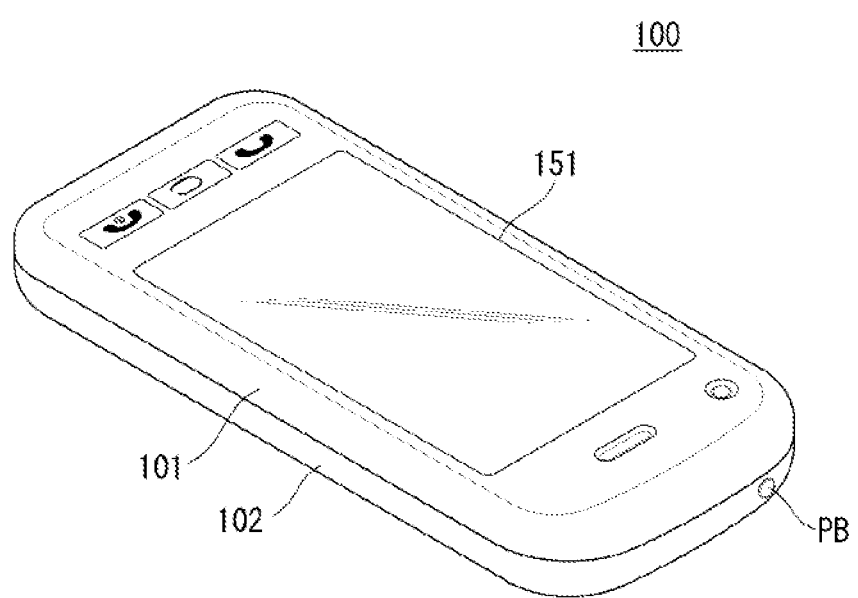
FIGS. 9 and 10 illustrate a note function display method of the mobile terminal of FIG. 1 according to another embodiment of the present invention.
Figure 10:
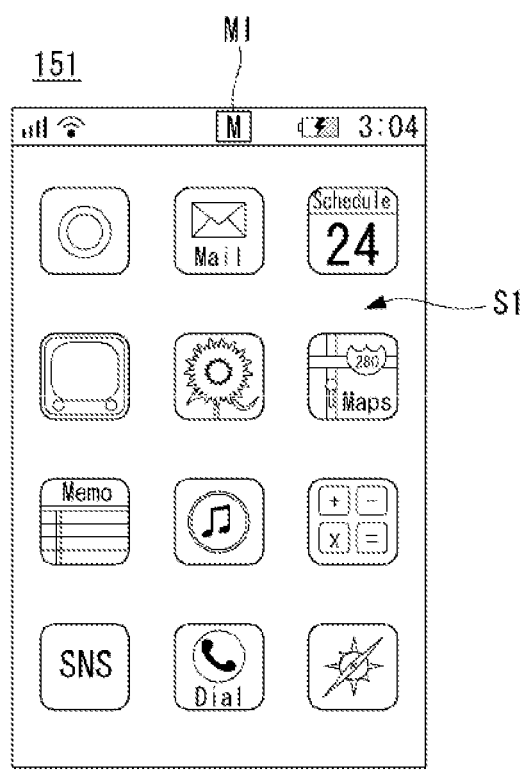
Figure 11:
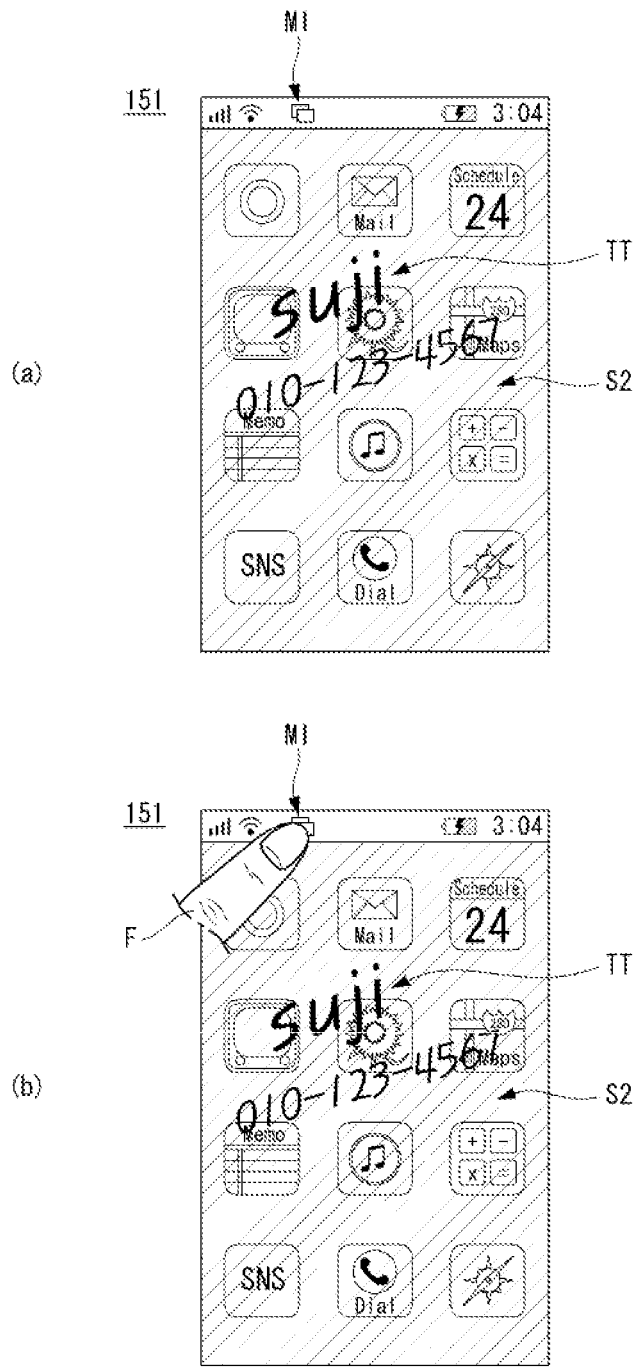
FIGS. 11 to 15 illustrate a procedure of controlling a back screen while a note is displayed.
Figure 12:
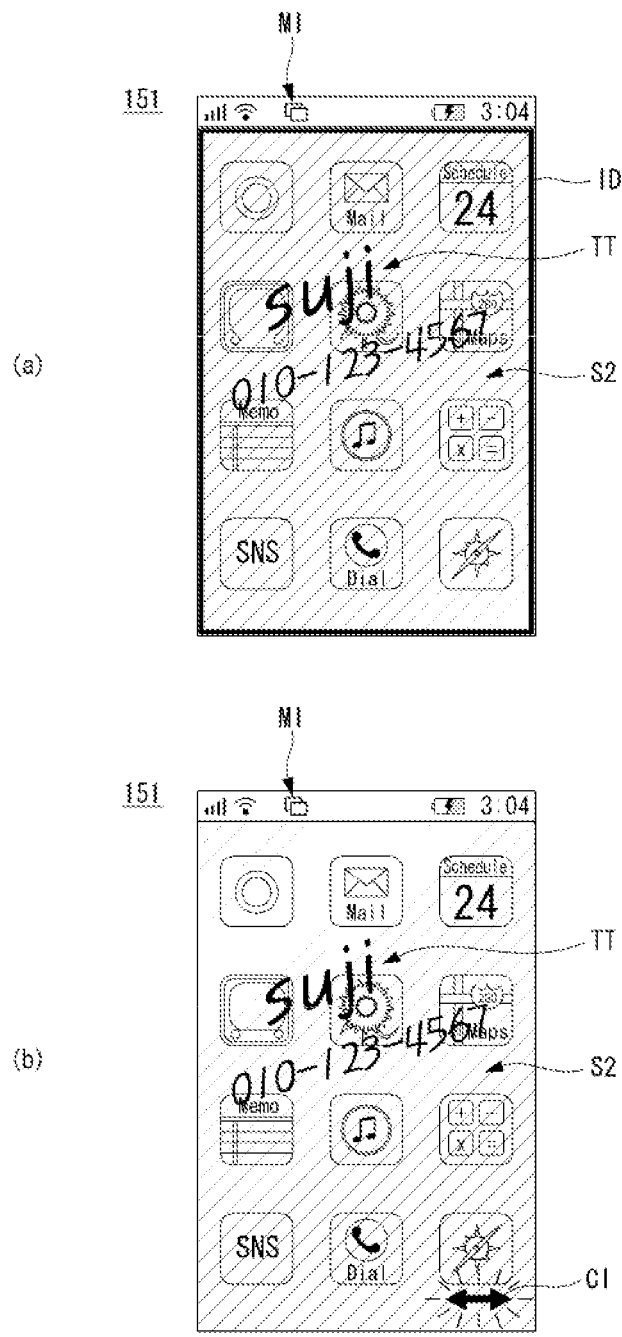
Figure 13:
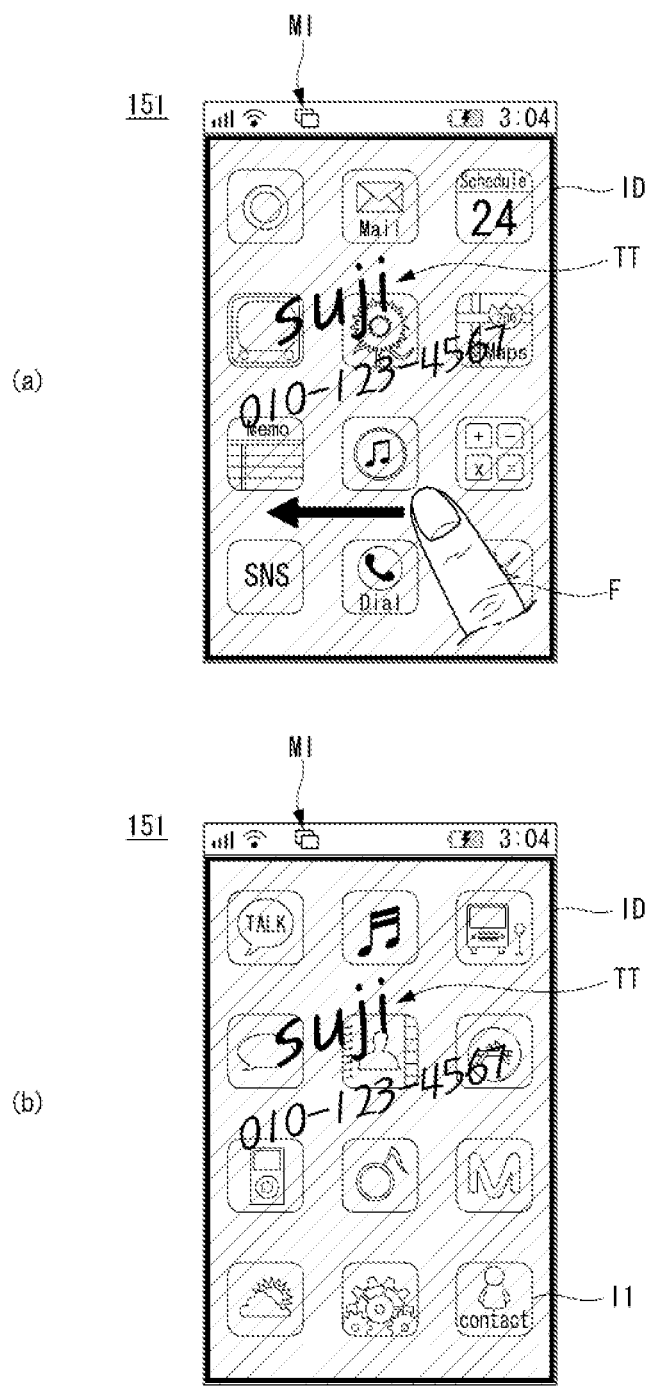
Figure 14:
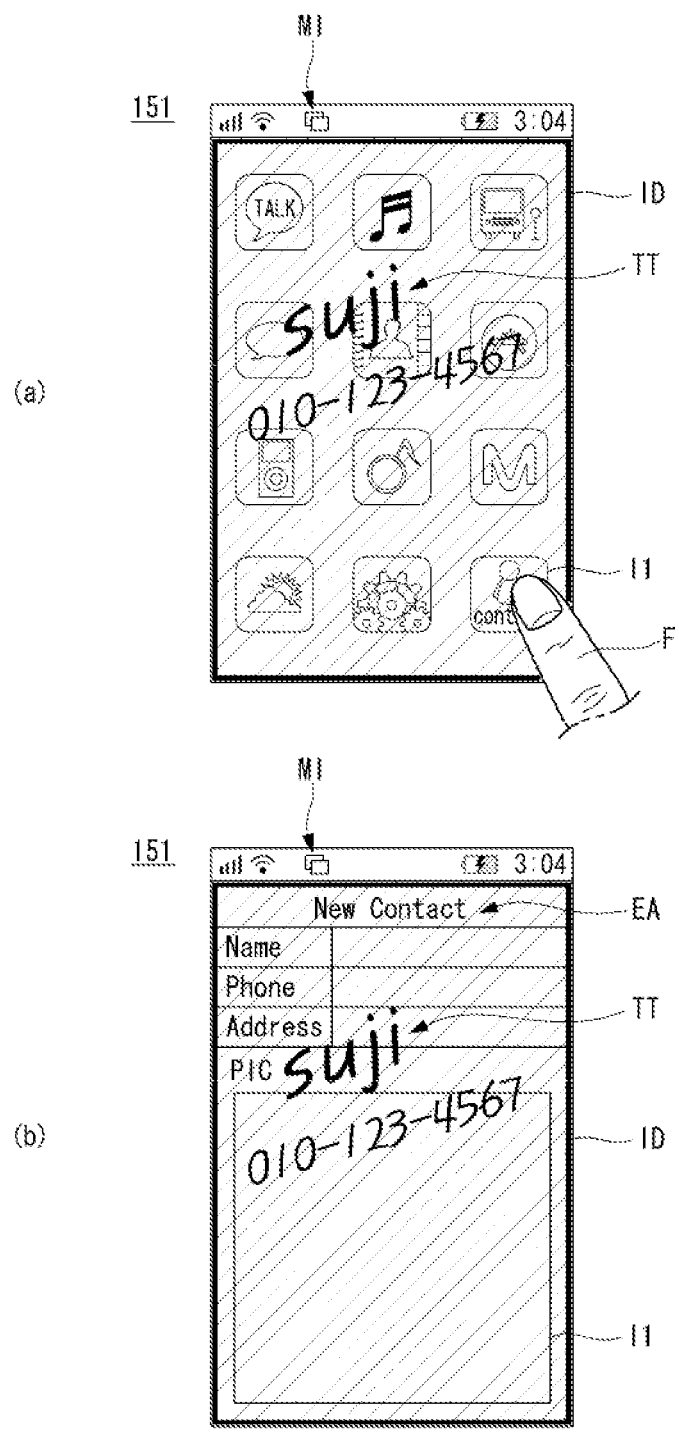
Figure 15:
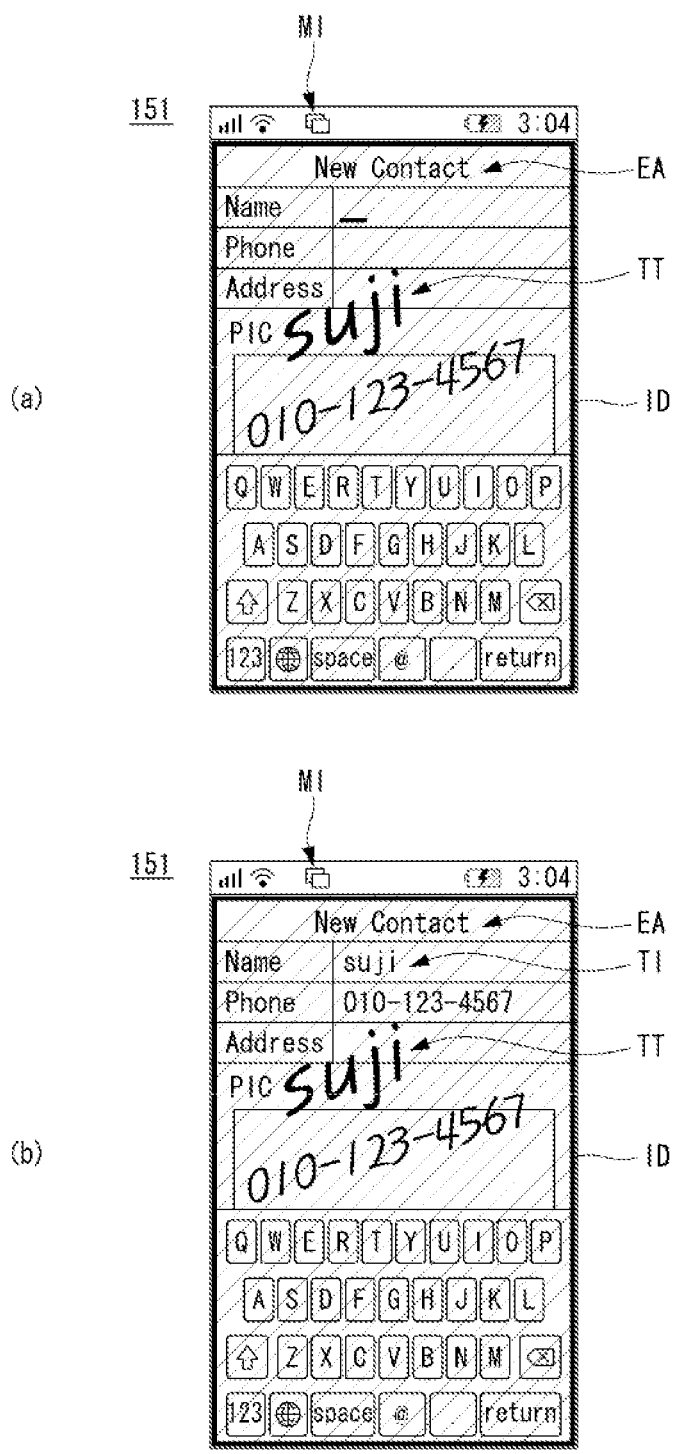
Figure 16:
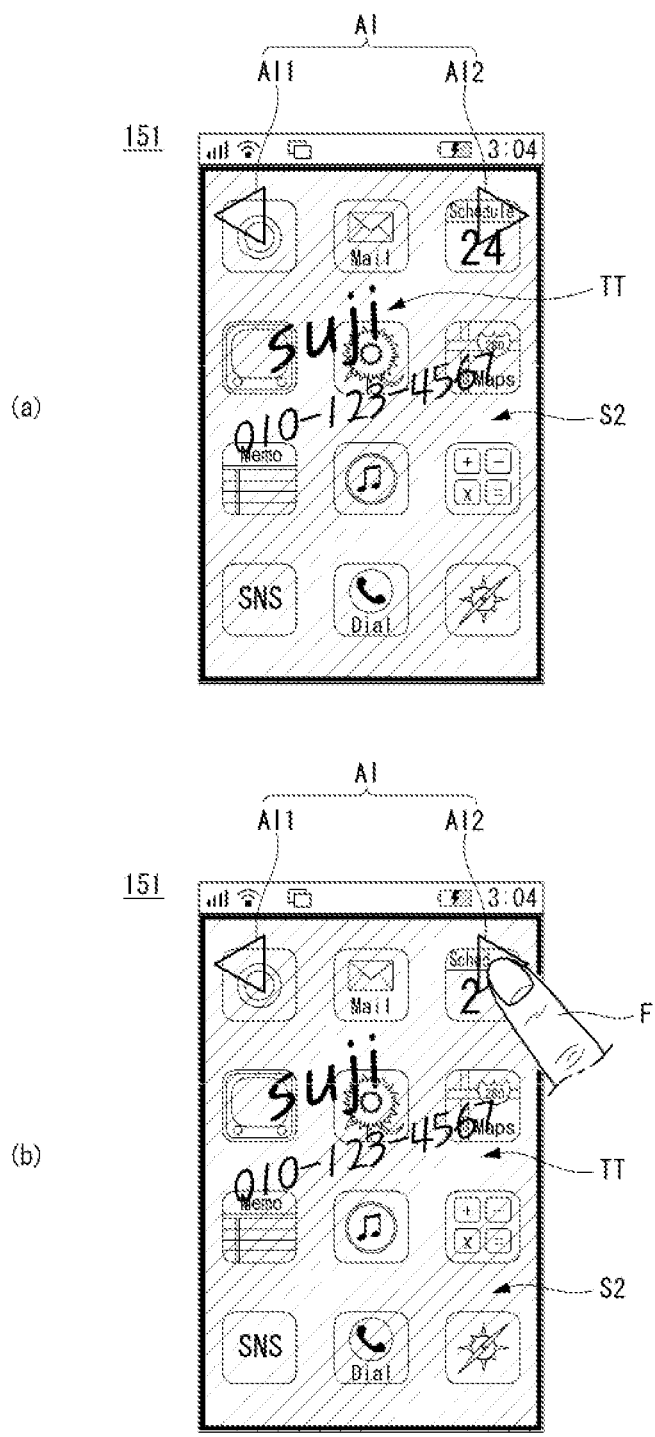
FIGS. 16 to 20 illustrate operations of function icons relating to the note function.

FIGS. 9 and 10 illustrate a note function display method of the mobile terminal of FIG. 1 according to another embodiment of the present invention.

Referring to FIG. 9, the mobile terminal 100 may include an operating button PB for activating the second layer S2.

The operating button PB may be provided to one side of the case of the mobile terminal 100. When the operating button PB is pressed, the controller 190 can enable the second layer S2. For example, the note function can be enabled when the operating button PB is selected regardless of content currently displayed on the display 151.

Referring to FIG. 10, the mobile terminal 100 may be provided with a quick menu button MI for activating the second layer S2.

The quick menu button MI may be displayed at a specific position on the display 151. For example, the quick menu button MI can be located on a status bar provided to the top end of the display 151. When the quick menu button MI is selected while the first layer S1 such as the back screen is displayed, the second layer S2 is enabled and thus the note function can be executed.

FIGS. 11 to 15 illustrate a procedure of controlling the back screen while the note function is executed to display a note.

As shown in FIGS. 11 to 15, after the user writes a note on the second layer S2 enabled through a touch operation, the controller 180 of the mobile terminal 100 can enable the first layer S1 to execute a desired function. One of the first and second screens S1 and S2, which will be controlled, can be selectively enabled through a touch input, and thus the user can perform a desired operation while checking a previously input note.

Referring to FIG. 11(a), the user can write a note on the second layer S2. For example, the user can quickly write the name and phone number of a specific person. The second layer S2 can be enabled using the quick menu button MI or the operating button PB provided to the case of the mobile terminal 100, as described above, or according to a touch operation of dragging a specific point of the display 151.

Upon activation of the second layer, a touch trajectory TT corresponding to the touch input of the user can be displayed. That is, even when icons are displayed on the display 151, no icon is selected by the touch input of the user and the touch trajectory TT corresponding to the touch input of the user can be displayed. Since the touch trajectory TT is visually displayed, the user can write a desired note.

Referring to FIG. 11(b), when the desired note has been written, the user may select a change menu MI. The change menu MI may be assigned a function of changing an enabled screen. When the user selects the change menu MI with the finger F, the controller 180 can change an enabled screen. For example, if the second layer S2 is being currently enabled, the controller 180 can enable the first layer upon selection of the change menu MI.

The controller 180 can control the touch input of the user to be applied to the enabled screen. That is, the controller 180 can apply an operation of the user to the enabled screen. For example, if the second layer S2 has been enabled, the touch input of the user can be visually displayed as the touch trajectory TT. On the contrary, when the first layer S1 has been enabled, an application relating to an icon corresponding to the point touched by the user can be executed.

Referring to FIG. 12(a), in order to allow the user to know that the second layer S2 is disabled according to selection of the change menu MI, the controller 180 can display an indicator ID. For example, a frame having a specific thick and/or color can be displayed around the second layer S2.

Referring to FIG. 12(b), inactivation of the second layer S2 according to selection of the change menu MI may be indicated using an indicator icon CI. The indicator icon CI is displayed at a specific point on the display 151 depending on whether the second layer S2 is enabled, and thus the user can intuitively recognize the current state.

Referring to FIG. 13(a), when the second layer S2 is disabled and the first layer S2 corresponding to the back screen is enabled, the user can perform a touch operation of dragging the display 151 from right to left using the finger F.

Referring to FIG. 13(b), the back screen corresponding to the first layer S1 can be changed according to the drag touch operation of the user. For example, the back screen can be changed from a first page on which icons belonging to a first group are displayed to a second page on which icons belonging to a second group are displayed. If the second layer S2 has been enabled, the touch trajectory TT would be displayed according to the drag touch operation of the user. However, since the first layer S1 has been enabled according to selection of the change menu MI, as described above, the touch operation of the user is applied to the first layer S1. Even if the first layer S1 is enabled according to a touch input of the user and display of the first screen S1 is changed according to the touch input of the user, the note written on the second layer S2 can be kept on the display 151.

Referring to FIG. 14(a), the user can continuously perform desired touch operations on the first layer S1. Since the first layer S1 including the back screen on which icons are displayed has been enabled, a specific icon on the first layer can be selected regardless of the note displayed on the second layer S2. For example, the user can select a contact icon I1 for inputting the note written on the second layer S2.

Referring to FIG. 14(b), when the contact icon I1 is selected from the first layer S1, the controller 180 can execute an application corresponding to the contact icon I1. For example, a contact application by which the user can input a new contact can be executed. In the following description, an application executed in the first layer is referred to as an execution application EA.

Referring to FIG. 15(a), when the user selects the item 'name' in the execution application EA, the controller 180 can display a qwerty keyboard by which the user can input characters to the item 'name'.

Referring to FIG. 15(b), the user can input a name and a phone number through the execution application EA with reference to the note written on the second layer S2. The user can use contents of the previously input note for the execution application EA while confirming the note, and thus user convenience can be improved.

FIGS. 16 to 20 illustrate operations of function icons relating to the note function.

As shown in FIGS. 16 to 20, the controller 180 of the mobile terminal 100 can display function icons AI by which functions applicable to the second layer S2 can be selected, on the second layer S2 on which the note function is executed.

Referring to FIG. 16(a), the controller 180 can display first and second function icons AI1 and AI2 when the second layer S2 is enabled. The first and second function icons AI1 and AI2 may respectively correspond to functions of displaying a previous note and the next note.

Referring to FIG. 16(b), the user can select one of the first and second function icons AI1 and AI2 using the finger F. For example, the user can select the second function icon AI2 corresponding to the function of displaying the next note following the current note.

Figure 17:
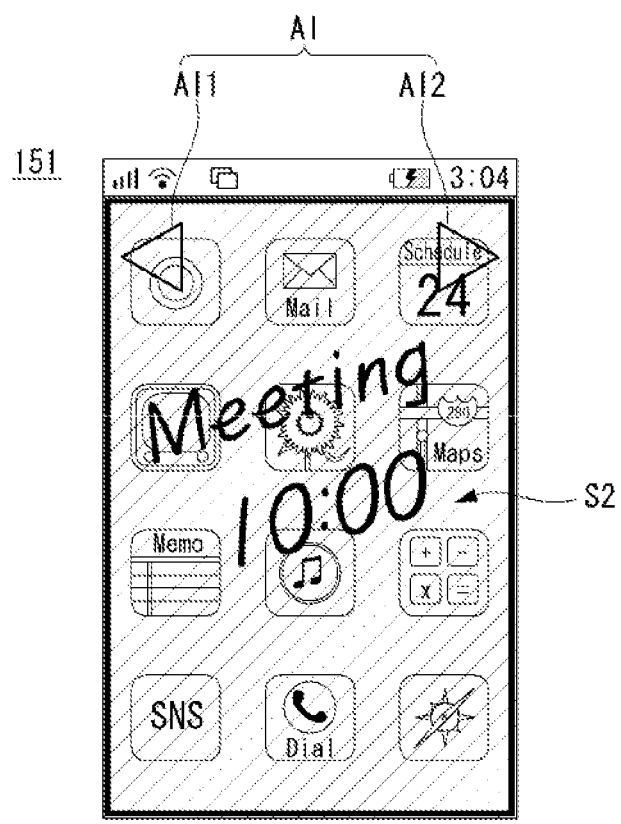
Figure 18:
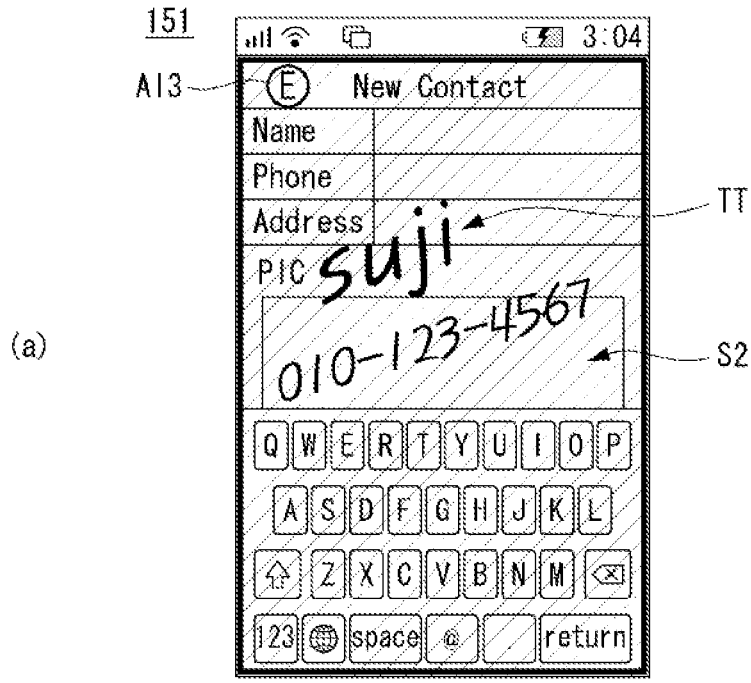
Figure 18:
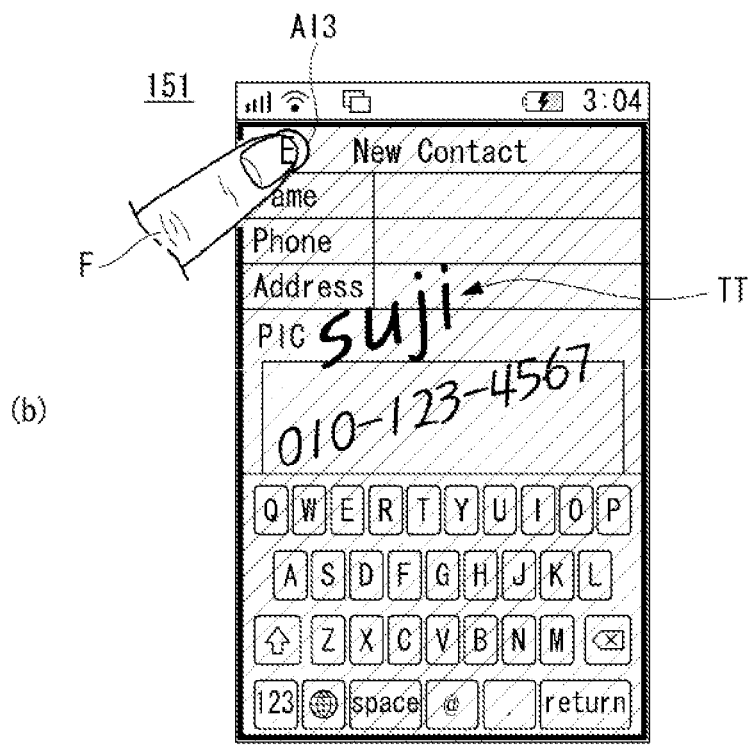
Figure 19:
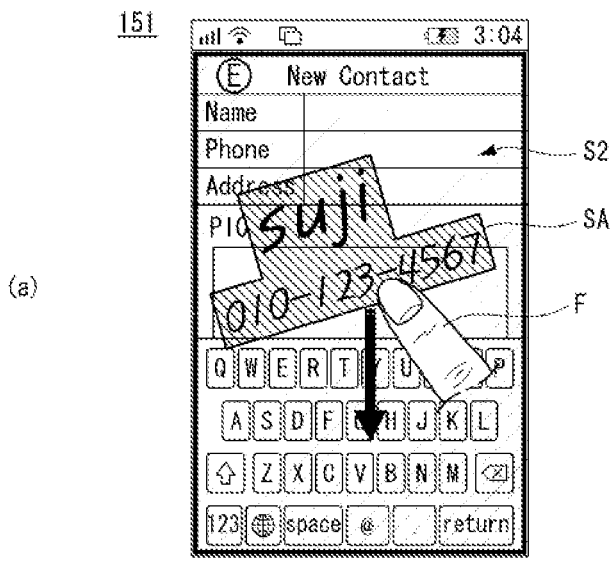
Figure 19:
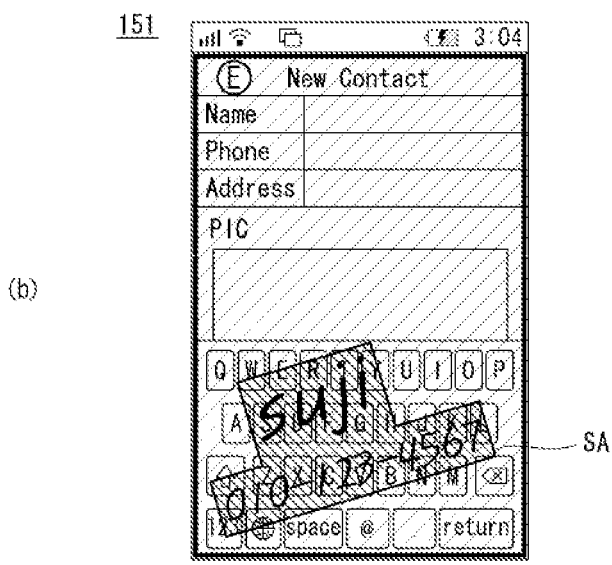

Referring to FIG. 17, the controller 180 can display the next note on the display 151 in response to the touch input of the user of selecting the second function icon AI2.

Referring to FIG. 18(a), the controller 180 can display a third function icon AI3. The third function icon AI3 may correspond to a function of editing a note previously input through the second layer S2.

Referring to FIG. 18(b), the user can select the third function icon AI3. As described above, the function icons AI including the third function icon AI3 may relate to a specific function of the second layer S2 regardless of the back screen or currently display screen of the display 151.

Referring to FIG. 19(a), upon selection of the third function icon AI3, the note written on the second layer S2 can be selected. Selection of the note can be indicated by a region selection indicator SA. The user can touch and drag the note indicated by the region selection indicator SA using the finger F.

Referring to FIG. 19(b), the controller 180 can move the note according to the touch and drag operation of the user.

Figure 20:
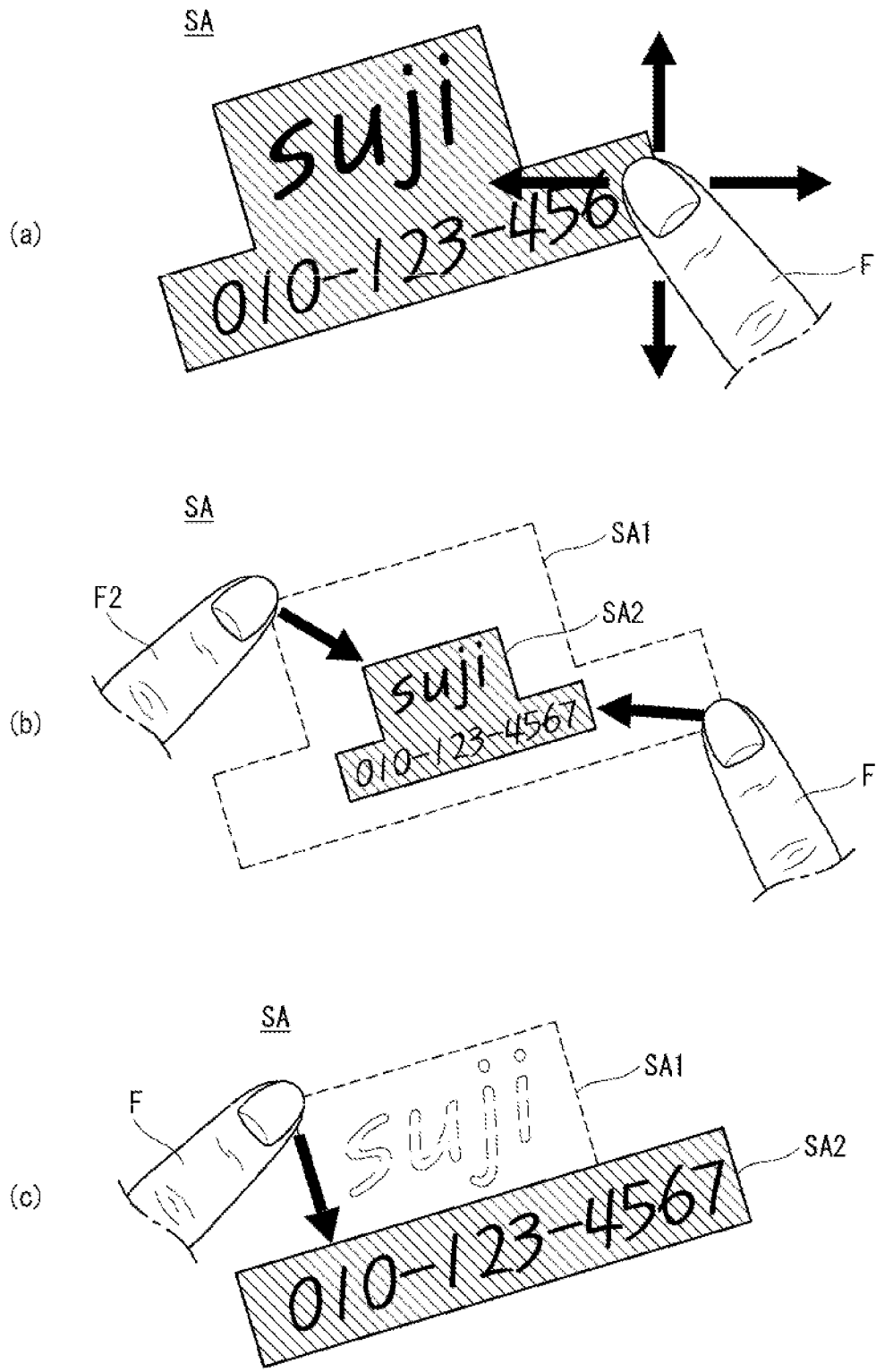

Referring to FIG. 20, various editing functions can be executed on the note displayed on the second layer S2.

Referring to FIG. 20(a), the display position of the note indicated by the region selection indicator SA can be changed by a touch input of the user using the finger F.

Referring to FIG. 20(b), the user can change the size of the displayed note through a multi-touch input using first and second fingers F1 and F2. For example, the size of the note can be changed from the size of a first region selection indicator SA1 corresponding to an initial state to the size of a second region selection indicator SA2. The displayed note can be enlarged according to touch direction.

Referring to FIG. 20(c), the user can partially delete the note indicated by the first region selection indicator SA1. The remaining part of the note can be indicated by the second region selection indicator SA2. Part of the displayed note can be changed when the user performs a touch operation of swiping the corresponding part using the finger F. On the contrary, a memo can be added to the previously written note through an editing procedure.

FIGS. 21 to 24 illustrate the relationship between the screen through which the note function is executed and the screen on which the back screen is displayed.

As shown in FIGS. 21 to 24, the controller 180 of the mobile terminal 100 can appropriately adjust relative positions of the first layer S1 and the second layer S2.

Figure 21:
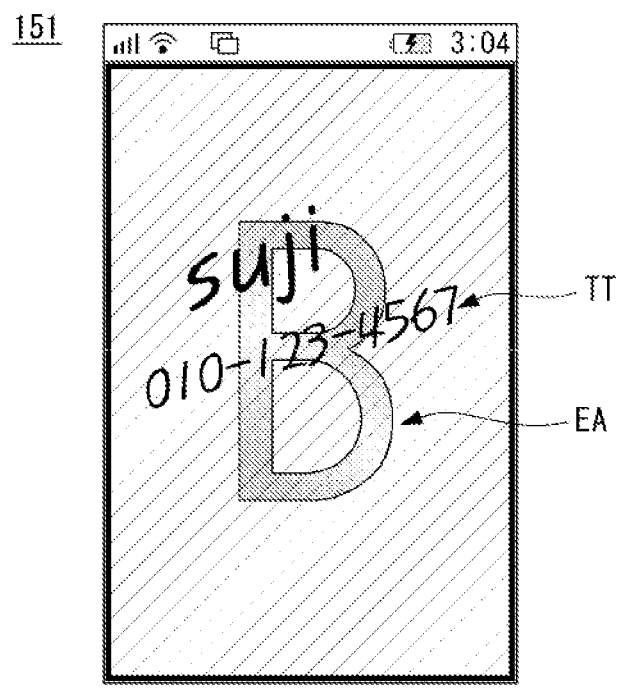
FIGS. 21 to 24 illustrate the relationship between a screen on which the note function is executed and a screen on which a back screen is displayed.

Referring to FIG. 21, an execution application EA currently being executed and the touch trajectory TT corresponding to the touch input of the user may be displayed on the display 151 in a superimposed manner. The execution application EA may be displayed according to execution of the back screen and/or a specific application. In the following, the execution application EA is represented by A, B and C for convenience. That is, A denotes a screen through which a specific application A is executed, and B represents a screen through which a specific application B is executed. The execution application EA and the touch trajectory TT may be respectively displayed on the first and second screens S1 and S2. A screen set as a transparent screen may be determined depending on the relative positions of the first and second screens S1 and S2.

Figure 22:
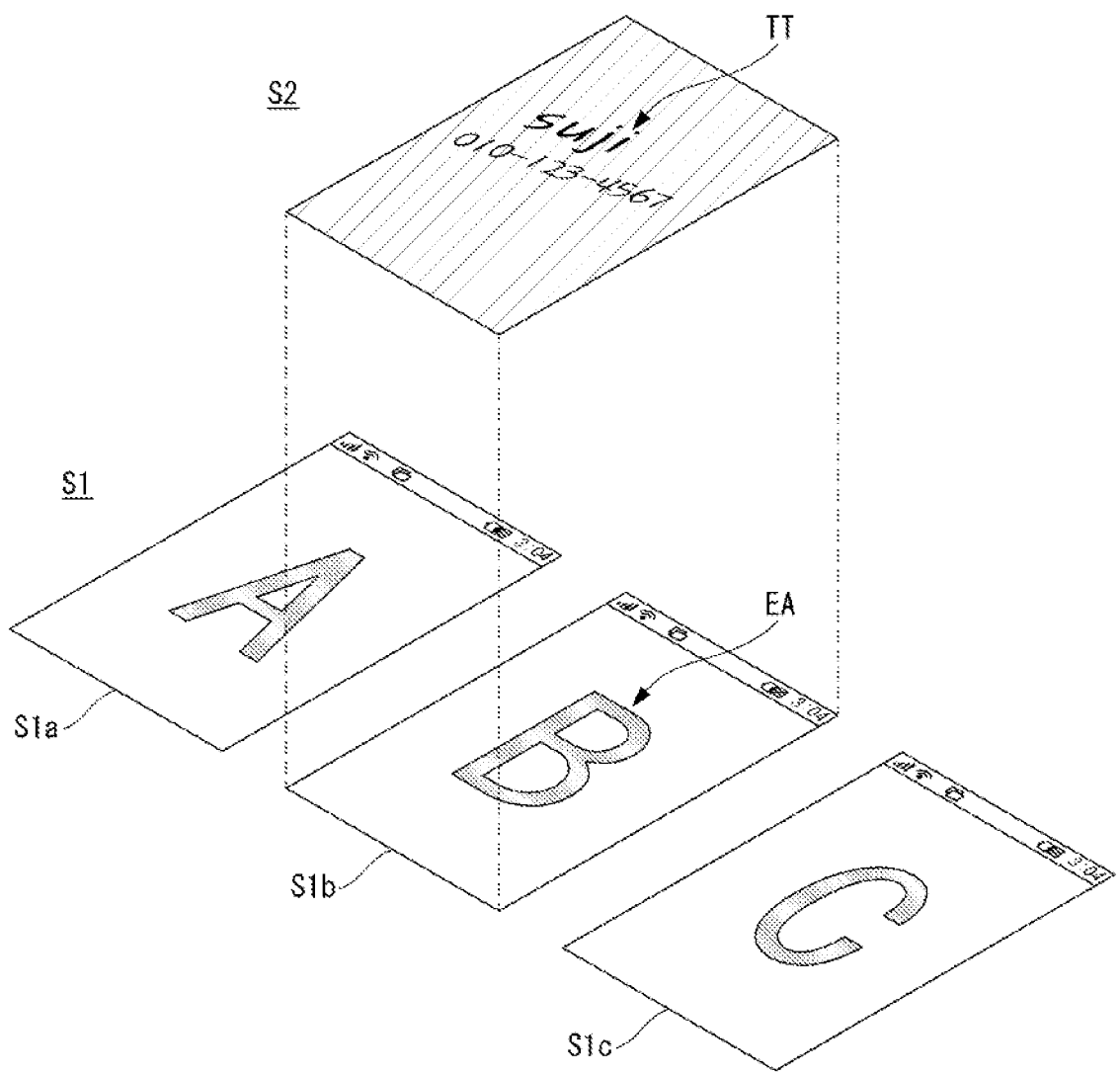

Referring to FIG. 22, the second layer S2 may be located on the first layer S1. If the first layer S1 is a back screen composed of a plurality of pages, a plurality of first layers S1a, S1b and S1c may be provided and, among them, the screen S1b may be currently displayed. That is, the screen S1b can correspond to the execution application EA.

When the second layer S2 is located on the first layer S1, the second layer S2 may be displayed in a transparent or translucent manner. That is, parts of the second layer S2 other than the touch trajectory TT can be transparent or translucent.

Accordingly, the screen S1b can be seen through the second layer S2.

Figure 23:
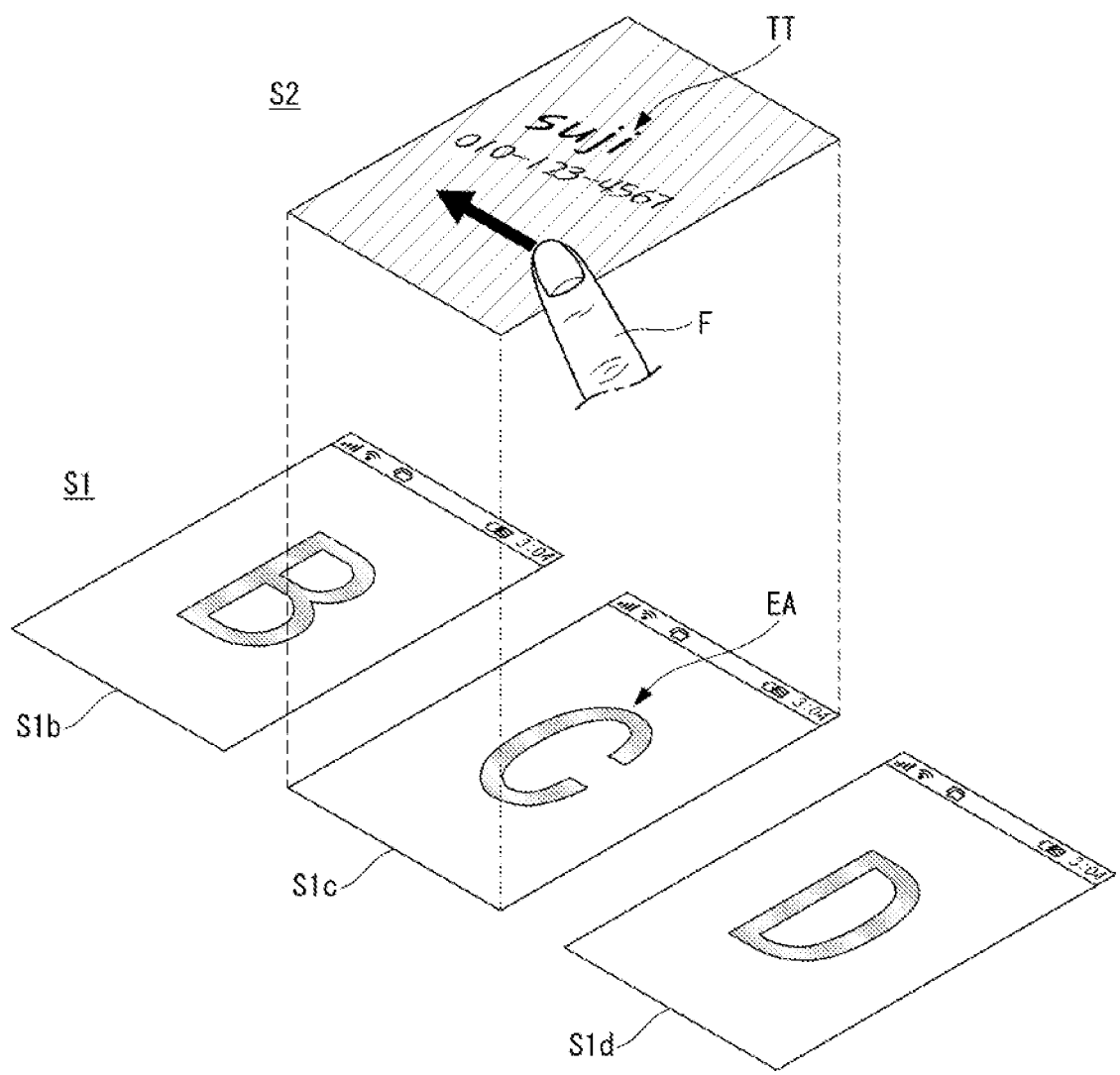

Referring to FIG. 23, the user can perform a touch operation using the finger F. That is, the user can change the displayed back screen to a different back screen according to a touch operation. Upon the touch operation by the user, the controller 180 can apply the touch operation to the first layer S1. For example, the controller 180 can display the screen S1c instead of the previously displayed screen S1b according to the touch operation. In this case, the screen S1c corresponds to the execution application EA.

Figure 24:
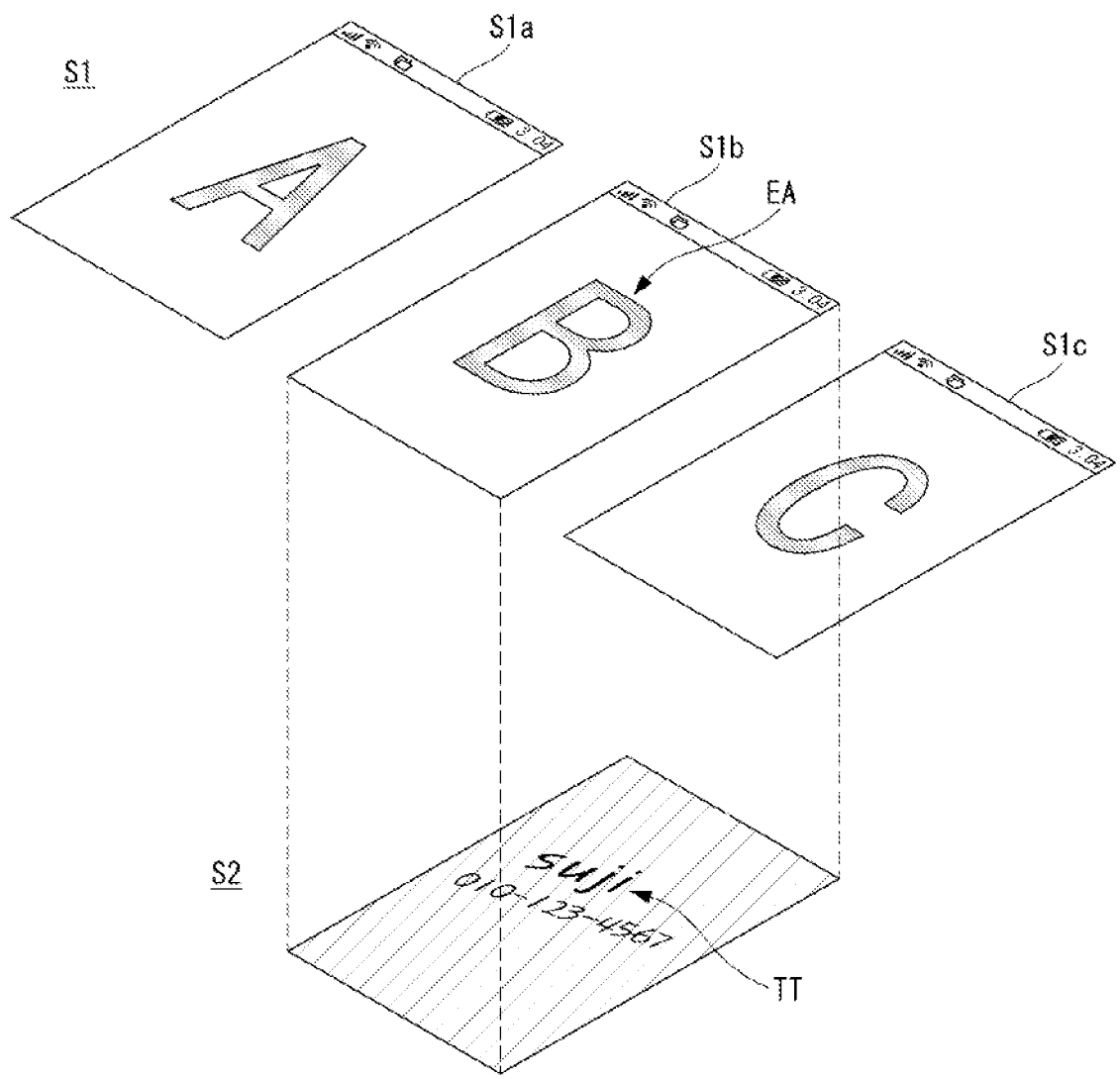

Referring to FIG. 24, the positions of the first and second screens S1 and S2 may be changed. That is, the first layer S1 can be an upper layer and the second layer S2 can be a lower layer. When the first layer S1 becomes the upper layer, part of the first layer S1 other than the information part can be transparent or translucent. Accordingly, the touch trajectory TT of the second layer S2 can be seen through the screen S1b corresponding to the execution application EA.

Figure 25:
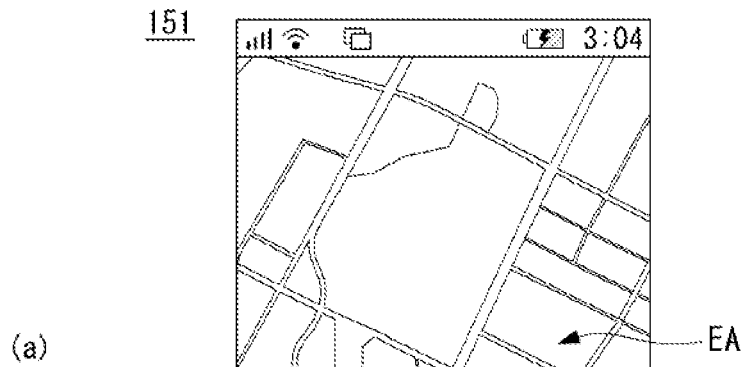
FIGS. 25 and 26 illustrate a case in which content is copied and used for the note function.
Figure 25:
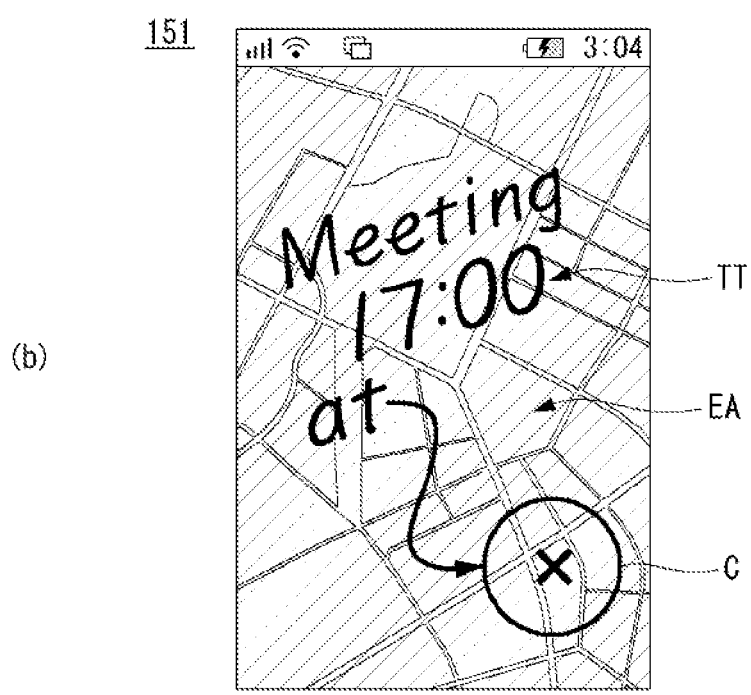
Figure 26:
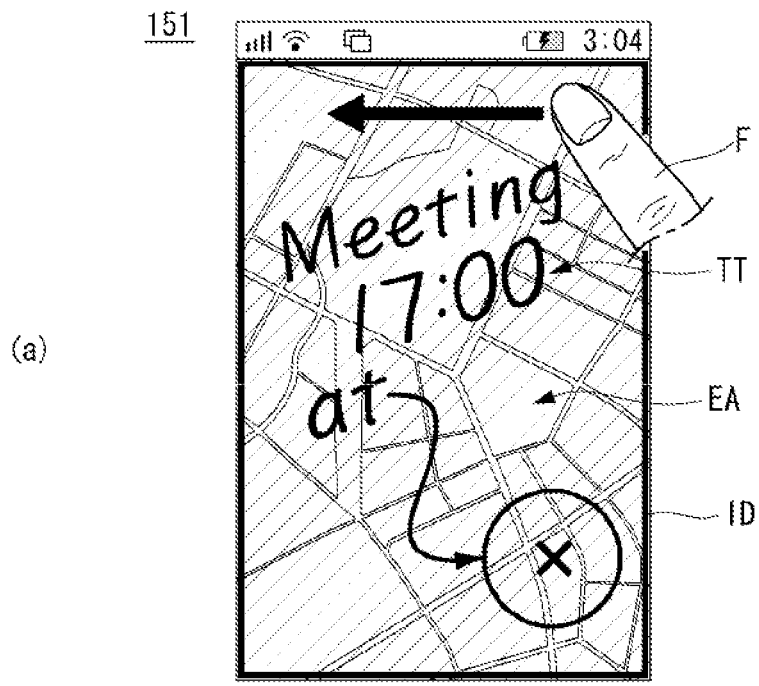
Figure 26:
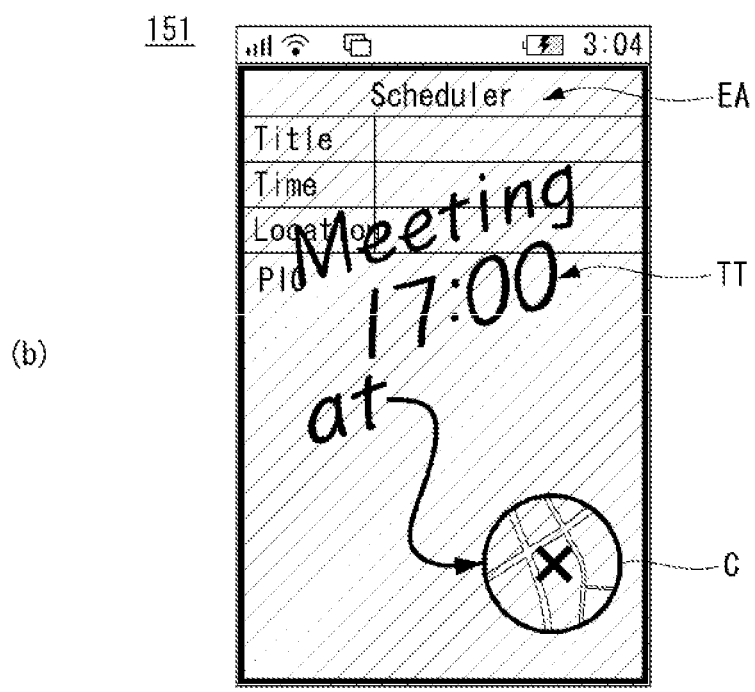
Figure 27:
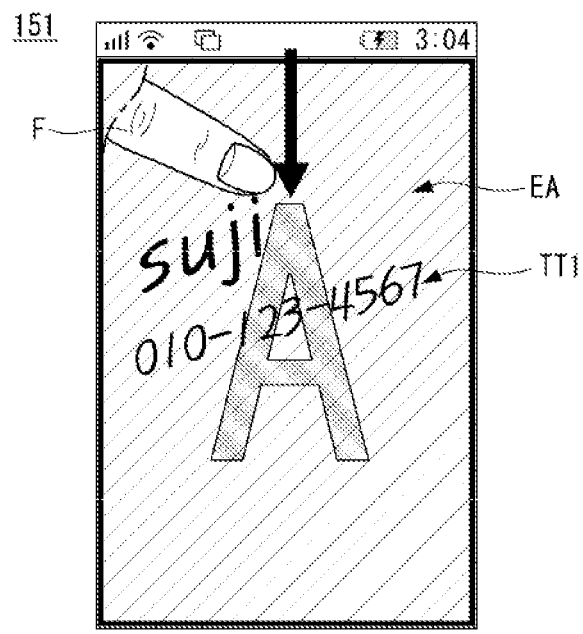
FIGS. 27 to 31 illustrate a method of displaying a plurality of second layers.
Figure 27:
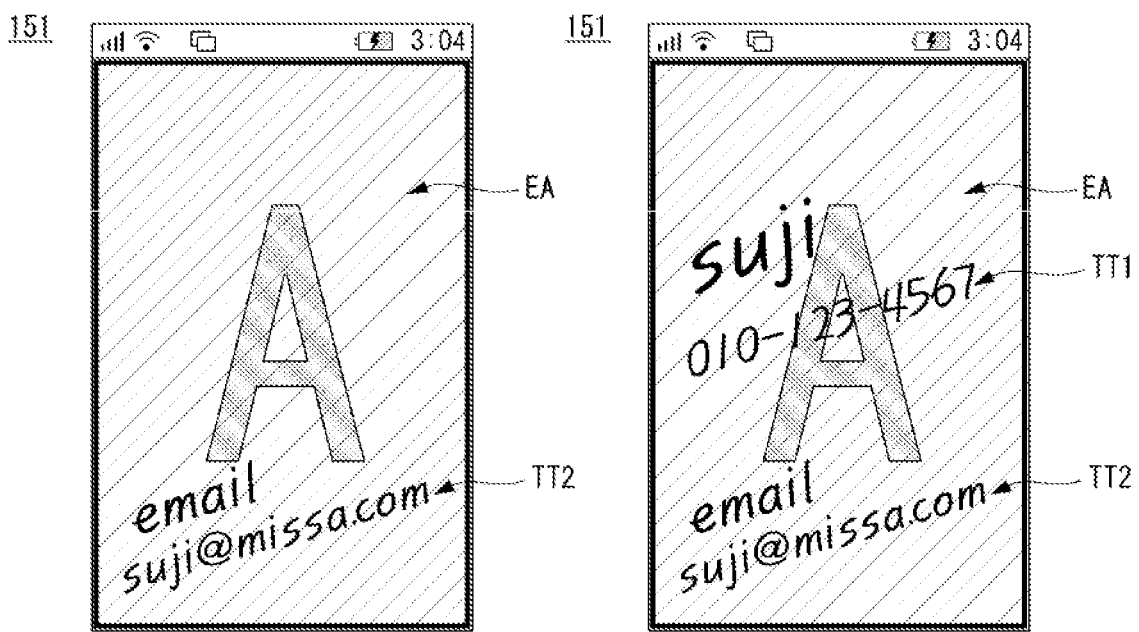

FIGS. 25 and 26 illustrate a function of copying content to use the content for the note function.

As shown in FIGS. 25 and 26, the controller 180 of the mobile terminal 100 can copy a specific area of the first layer S1 and display the copied area on the second layer S2.

Referring to FIG. 25(a), an execution application EA may be displayed on the display 151. The execution application EA may be a map application.

Referring to FIG. 25(b), the user can execute the quick note function to input a desired touch trajectory TT. Here, the user can select a desired part of the execution application EA displayed on the first layer S1. For example, when a circle trajectory C of a looped curve having a predetermined size is input, or a specific touch in the form of 'X' is applied to the inside of the circle trajectory C, the controller 180 can determine that the user selects the circle trajectory C.

Referring to FIG. 26(a), the user can perform a touch operation on the execution application EA in the horizontal direction of the display 151. The horizontal touch operation performed on the execution application EA can be indicated by the indicator ID. That is, the horizontal touch operation changes the first layer S1, that is, changes the execution application EA rather than adding a touch trajectory to the second layer S2.

Referring to FIG. 26(b), the execution application EA can be changed from the map application to a different application according to the horizontal touch operation. For example, the map application can be changed to a scheduler application for using a written note. Here, the part of the map application, which corresponds to the selected circle trajectory C, may be copied to the second layer S2. The user can easily input desired content to the scheduler with reference to the copied map image.

FIGS. 27 to 31 illustrate a method of displaying a plurality of second layers.

As shown in FIGS. 27 to 31, the controller 180 of the mobile terminal 100 can display a plurality of second layers in various manners.

Referring to FIG. 27(a), the user can perform a specific touch operation on the display 151. The specific touch operation may be a touch operation of displaying a different note.

Referring to FIG. 27(b), when the user performs the specific touch operation, the controller 180 can display a second touch trajectory TT2 instead of the previously displayed first touch trajectory TT1. That is, the specific touch operation may correspond to an operation of changing a displayed touch trajectory.

Referring to FIG. 27(c), when the user performs the specific touch operation, the controller 180 may display the second touch trajectory TT2 along with the previously displayed first touch trajectory TT1. That is, the specific touch operation may correspond to an operation of displaying a plurality of touch trajectories on one screen.

Figure 28:
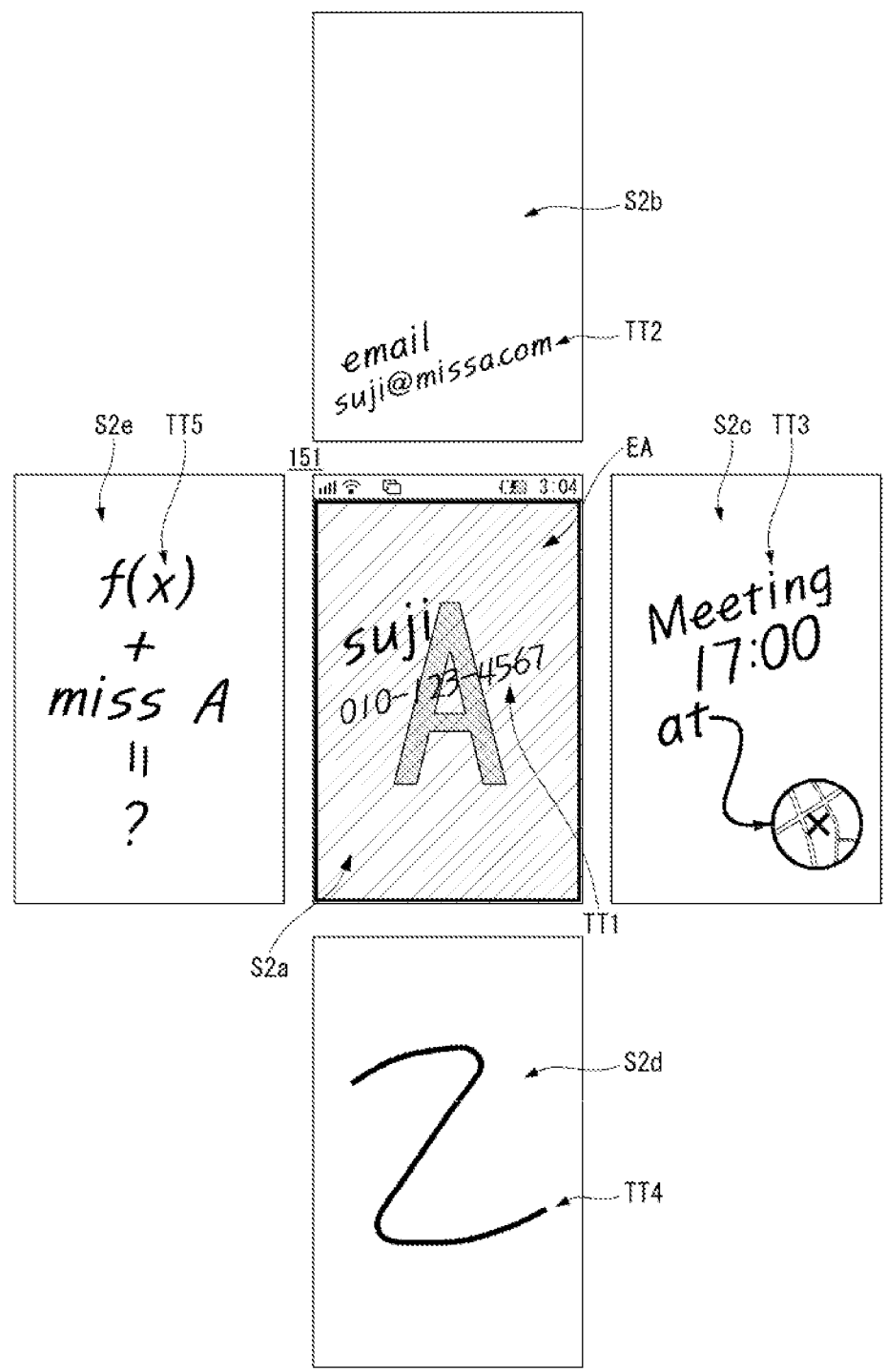

Referring to FIG. 28, virtual second layers S2 may be arranged around the display 151. For example, a second layer S2a including the first touch trajectory TT1 can be currently displayed on the display 151, and virtual second layers S2b to S2e can be arranged around the second screen S2a. The virtual second layers S2a to S2e may respectively include first to fifth touch trajectories TT1 to TT5.

The user can display a desired second layer on the display 151. For example, the user can display the second screen S2b arranged above the second screen S2a on the display 151 by a downward drag touch operation. Otherwise, the user can display the second screen S2c arranged on the right of the second screen S2a on the display 151 by a drag touch operation from left to right. The controller 180 can display a plurality of notes in a superimposed manner or display a new note replacing a previously displayed note.

Figure 29:
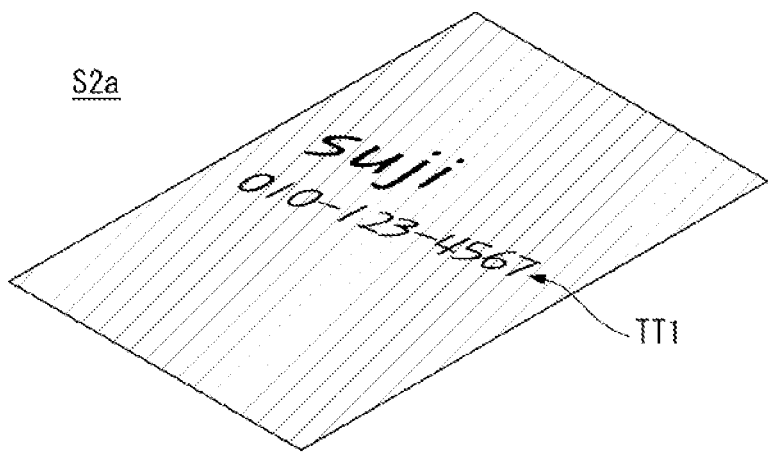
Figure 29:
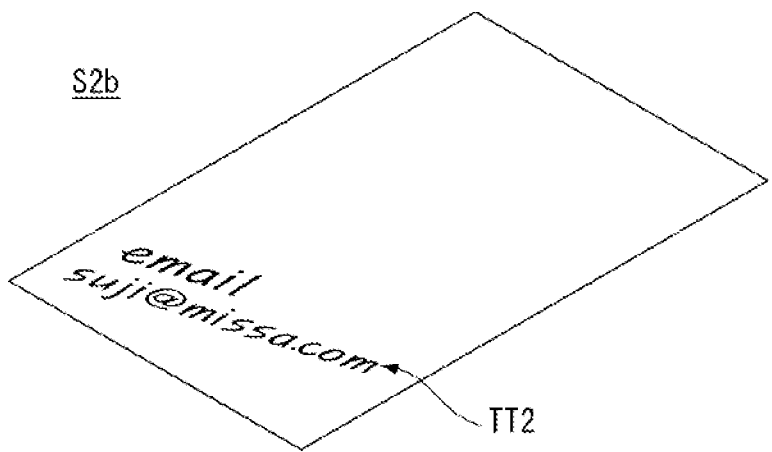
Figure 29:
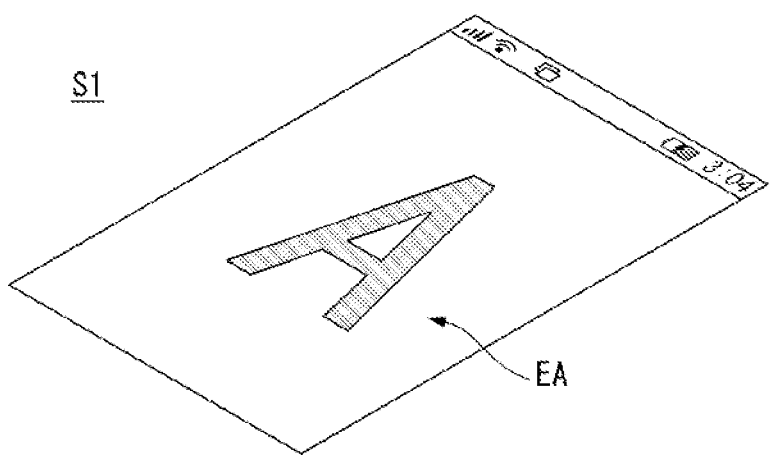
Figure 30:
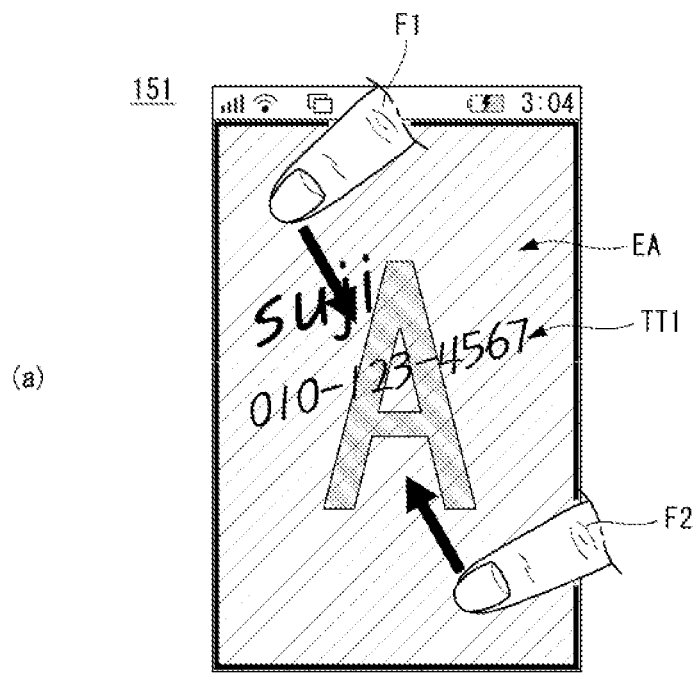
Figure 30:
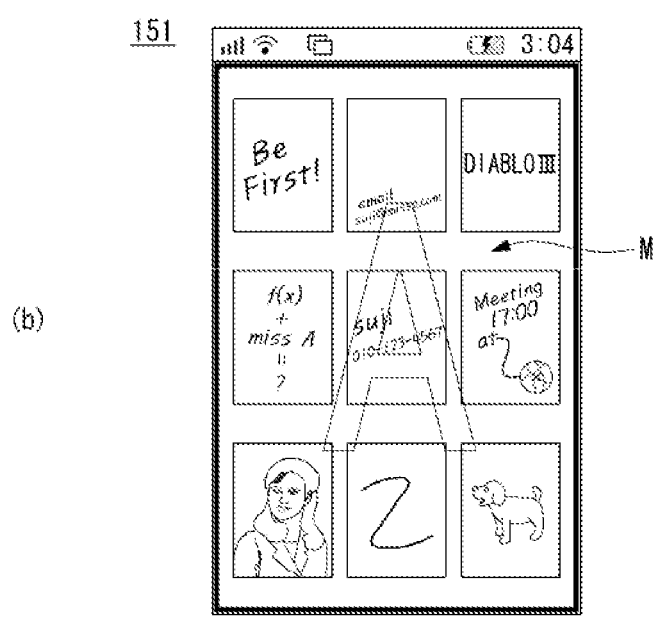
Figure 31:
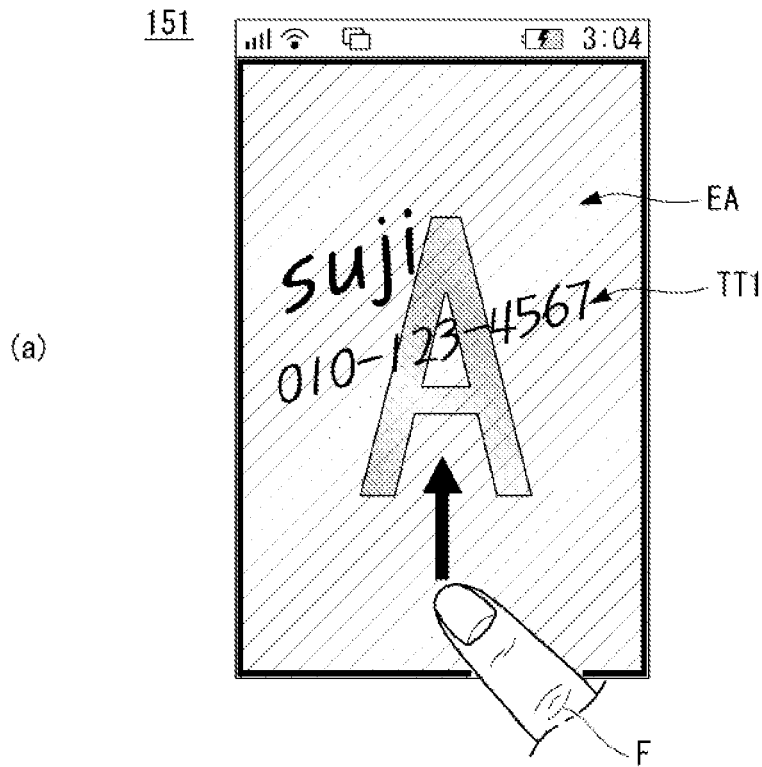
Figure 31:
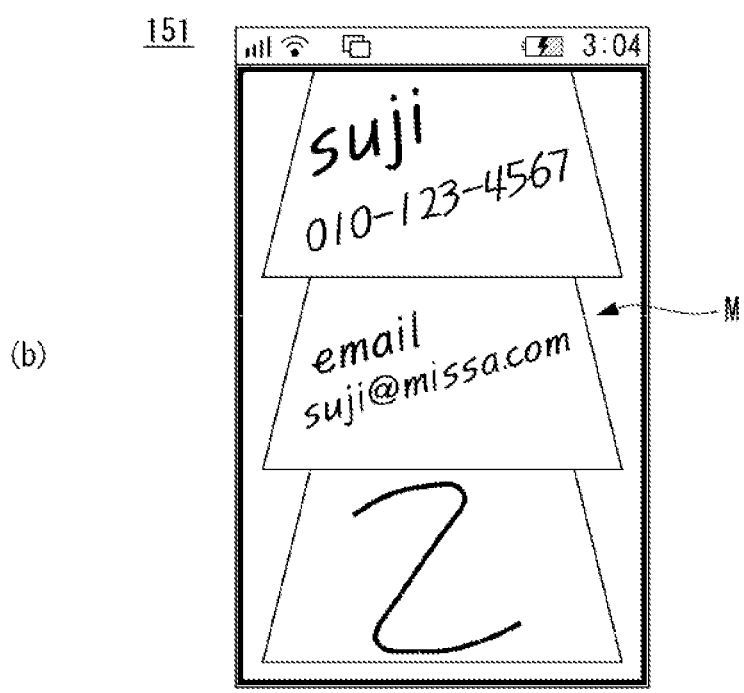
Figure 32:
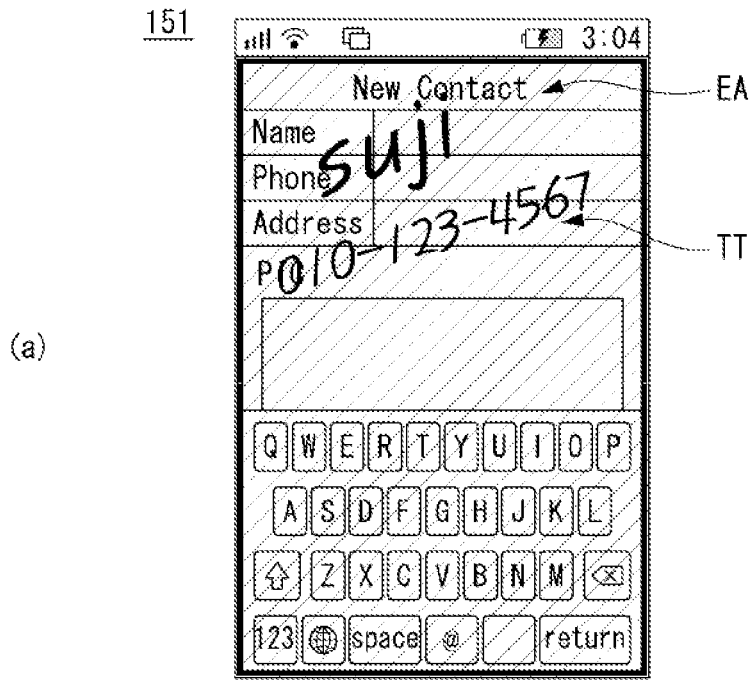
FIGS. 32 to 37 show memo content display forms according to input state.
Figure 32:
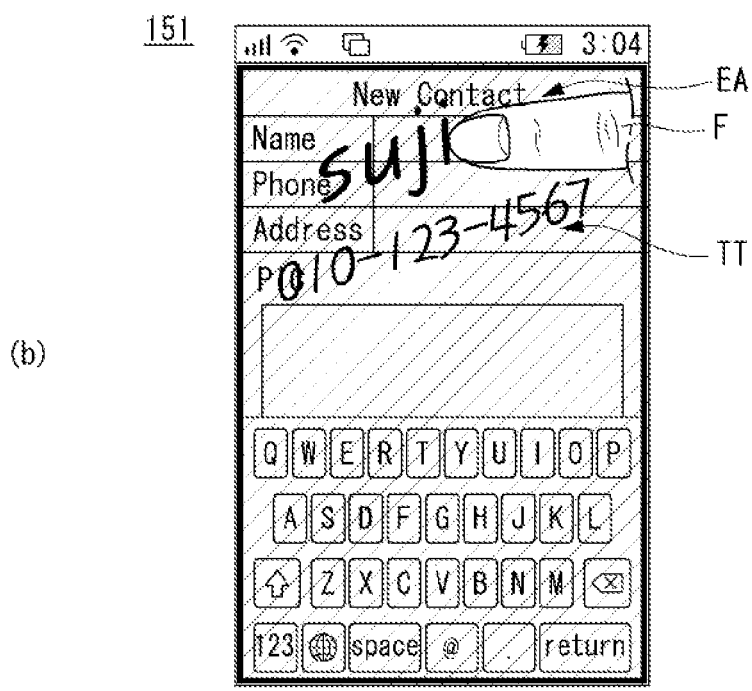
Figure 33:
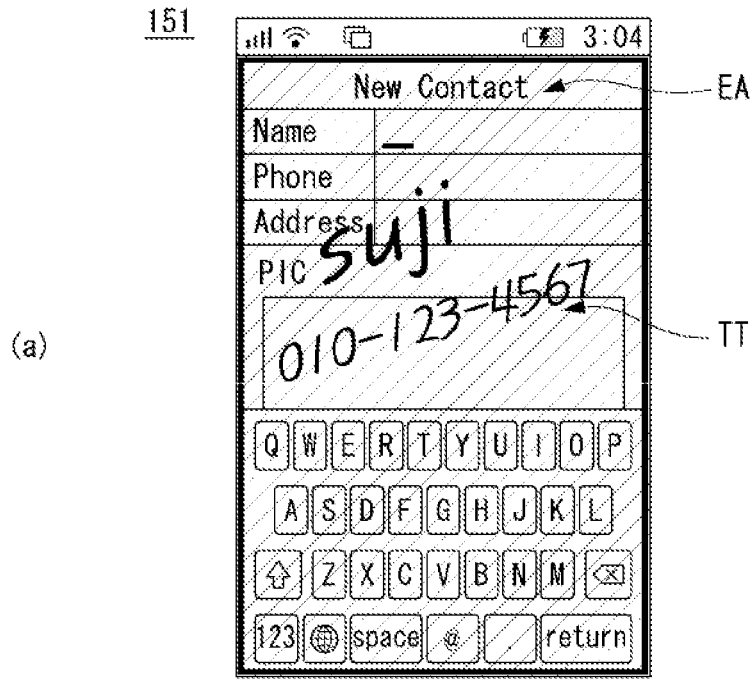
Figure 33:
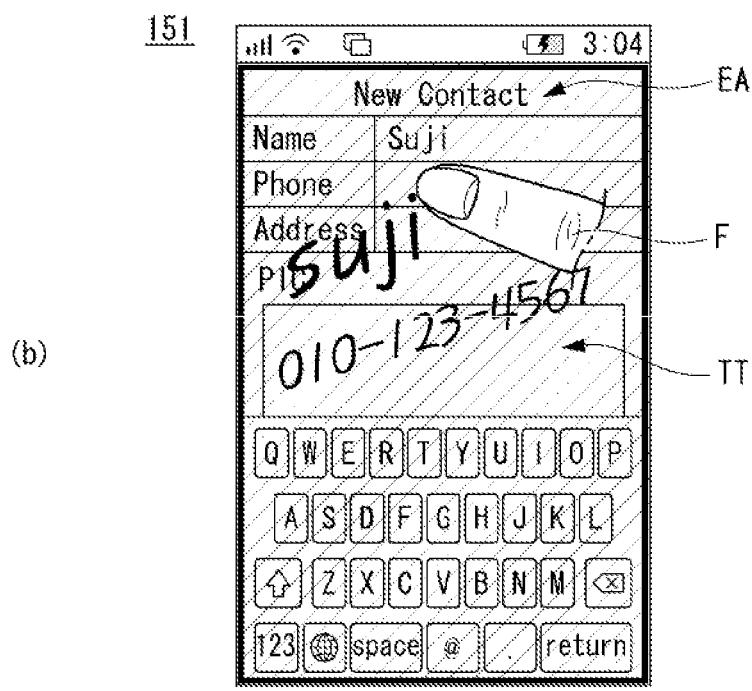
Figure 34:
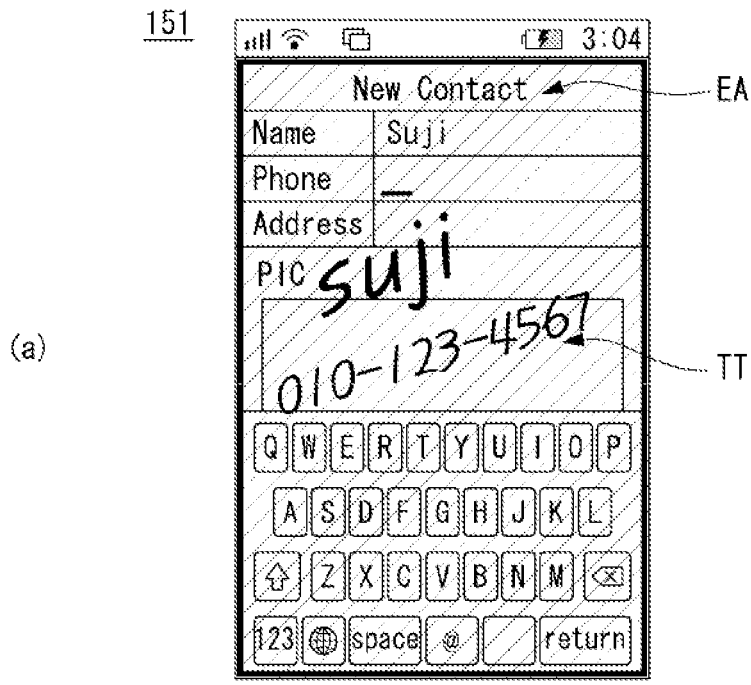
Figure 34:
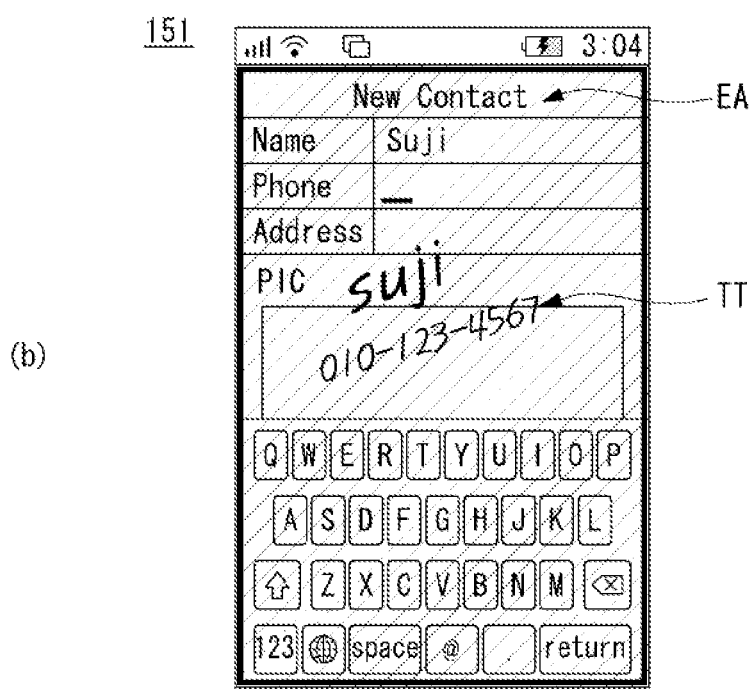
Figure 35:
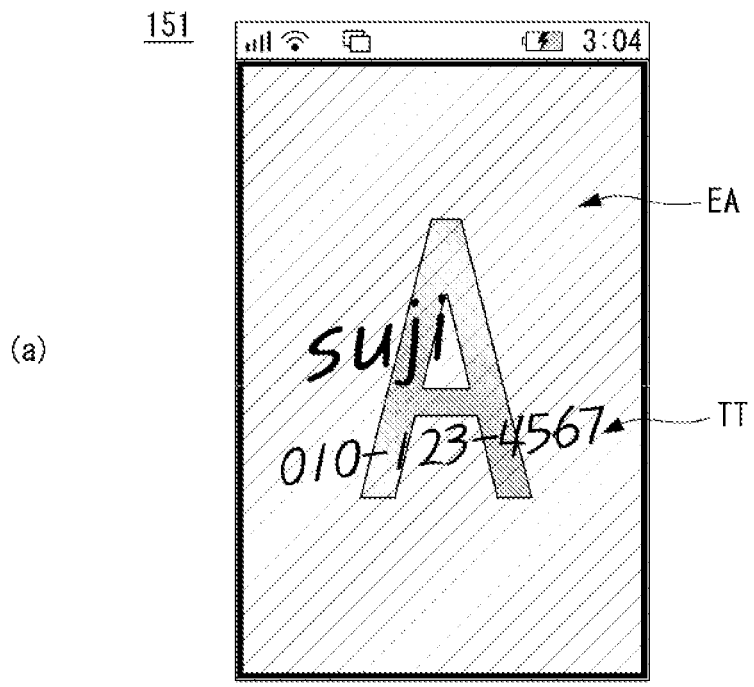
Figure 35:
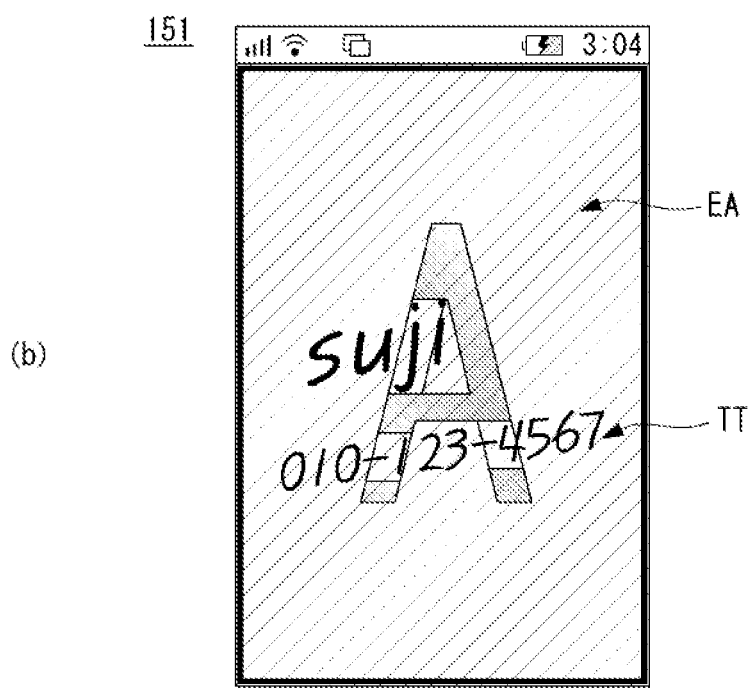

Referring to FIG. 29, display of a plurality of notes in a superimposed manner may be regarded as overlap of three or more layers. That is, it may be considered that the second screens S2a and S2b including the first and second touch trajectories TT1 and TT2 are located on the first layer S1 displaying the execution application EA. Parts of the second screens S2a and S2b other than the first and second touch trajectories TT1 and TT2 are transparent or translucent, and thus the first layer S1 can be seen even though the second screens S2a and S2b are positioned on the first layer S1.

Referring to FIG. 30(a), the user can perform a multi-touch operation using the first and second fingers F1 and F2. The multi-touch operation may be a pinch-in multi-touch of the first and second fingers F1 and F2.

Referring to FIG. 30(b), upon the pinch-in multi-touch operation, the controller 180 can display a plurality of memos M in the form of tiles. That is, the memos M can be collectively displayed on the display 151. In this case, the user can search previously input memos more rapidly.

Referring to FIG. 31(a), the user can perform a specific touch operation using the finger F from bottom to top of the display 151.

Referring to FIG. 31(b), upon the specific touch operation of the user, the controller 180 can display a plurality of memos M three-dimensionally. That is, the second layer S2 including the plurality of memos M can be displayed in a three-dimensional form including a plurality of layers. When the user performs an upward or downward dragging or flicking operation, the controller 180 can display a plurality of layers in the direction of the dragging or flicking touch operation. Since the second layer S2 is displayed in the form of a plurality of layers, the user can easily search previously input memos M.

FIGS. 32 to 37 illustrate note content display forms according to input state.

As shown in FIGS. 32 to 37, the controller 180 of the mobile terminal 100 can display the touch trajectory TT in various manners such that visibility of the touch trajectory TT increases or the visibility of the execution application EA is prevented from decreasing due to the touch trajectory TT.

Referring to FIG. 32(a), the touch trajectory TT can be displayed on the display 151 on which an execution application EA by which contact information is input is executed.

Referring to FIG. 32(b), the user can touch a specific point of the execution application EA to input an item. For example, the user can touch the item 'name'. Here, the previously input touch trajectory TT may be displayed on the item 'name' selected by the user. That is, the touch trajectory TT is superimposed on the item selected by the user, and thus the touch trajectory TT and characters input to the item by the user may overlap.

Referring to FIG. 33(a), the controller 180 can change the location of the touch trajectory TT such that the touch trajectory TT is not superimposed on the input item. For example, if the item 'name' waits for an input, the touch trajectory TT superimposed on the item 'name' can be moved downward.

Referring to FIG. 33(b), the user can select the item 'phone' using the finger F. That is, the user may attempt to input a phone number.

Referring to FIG. 34(a), upon selection of the item 'phone number' by the user, the controller 180 can change the location of the touch trajectory TT such that the touch trajectory TT is not superimposed on the selected item. For example, the user can move the touch trajectory TT downward. In this manner, the location of the touch trajectory TT can be controlled such that the touch trajectory TT is not superimposed on a specific item in which the user is currently interested, and thus user convenience can be improved.

Referring to FIG. 34(b), the controller 180 can change the size of the touch trajectory TT. For example, when it is difficult to prevent the touch trajectory TT from being superimposed on the information displayed therebelow, the size of the touch trajectory TT can be reduced. Furthermore, the size of the touch trajectory TT may be increased on the basis of an input position of information and the size of the touch trajectory TT to be displayed.

Referring to FIG. 35(a), part of the touch trajectory TT may be superimposed on content of the execution application EA. For example, if the color of the content displayed according to the execution application EA is identical to the color of the touch trajectory TT, the user may have difficulty in discriminating the content and touch trajectory TT from each other at the overlap part of the content and the touch trajectory TT.

Referring to FIG. 35(b), the controller 180 can change the color of the overlap part. For example, the controller 180 can change the color of the touch trajectory TT at the overlap part. Accordingly, the user can easily recognize the touch trajectory TT.

Figure 36:
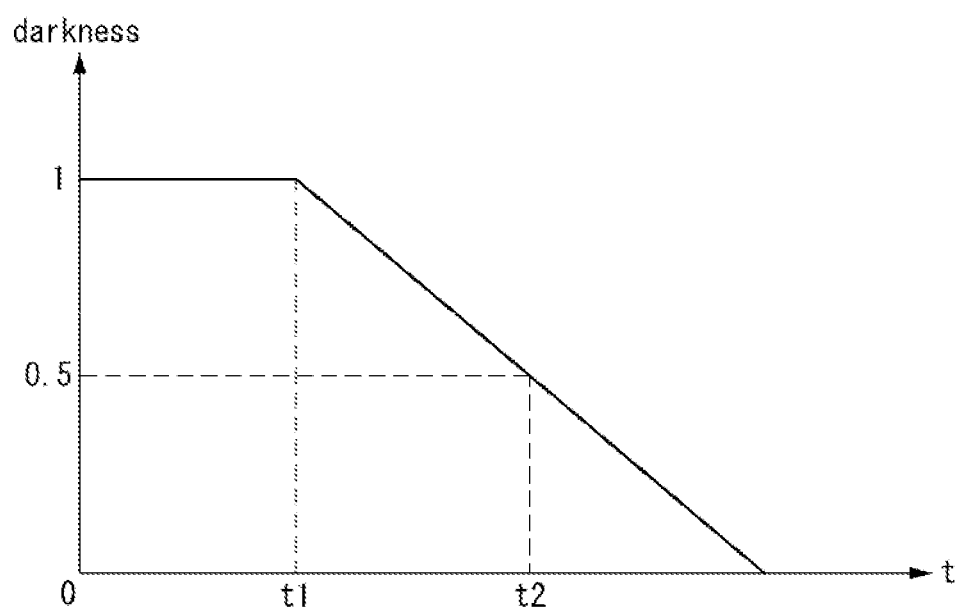
Figure 37:
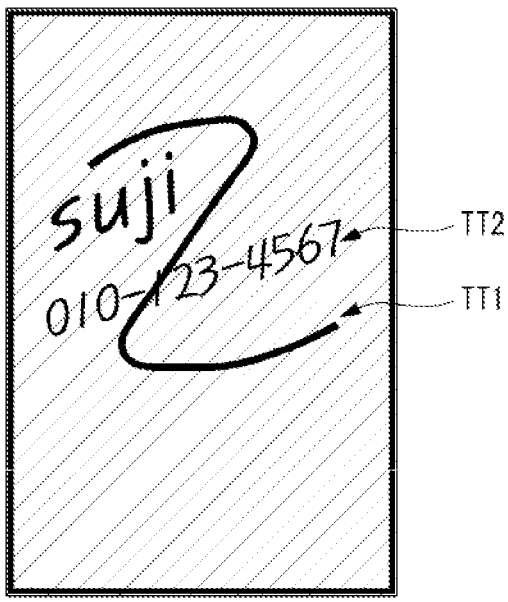
Figure 37:
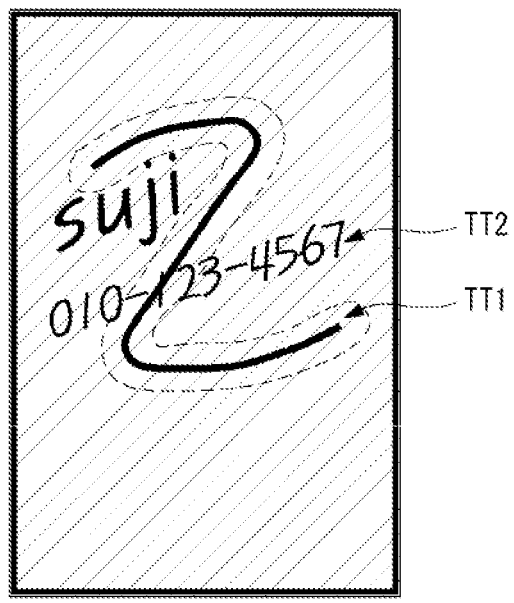
Figure 37:
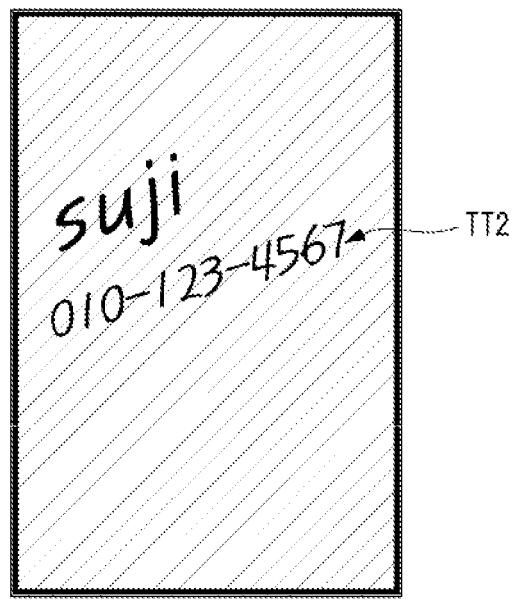

Referring to FIG. 36, the controller 180 can change the darkness of the touch trajectory TT with time. For example, the controller 180 can maintain uniform darkness of the touch trajectory TT until time t1 and then decrease the darkness of the touch trajectory TT with time after t1.

Referring to FIG. 37(a), first and second touch trajectories TT1 and TT2 may be displayed on the display 151. Here, the first touch trajectory TT1 may correspond to a note input prior to the second touch trajectory TT2.

Referring to FIG. 37(b), the darkness of the first touch trajectory TT1 may change with time. For example, the darkness of the first touch trajectory TT1 may decrease with time.

Referring to FIG. 37(c), the first touch trajectory TT1 may completely disappear after a time. An older note becomes faint or disappears with time to allow the user to easily recognize the latest note.

Figure 38:
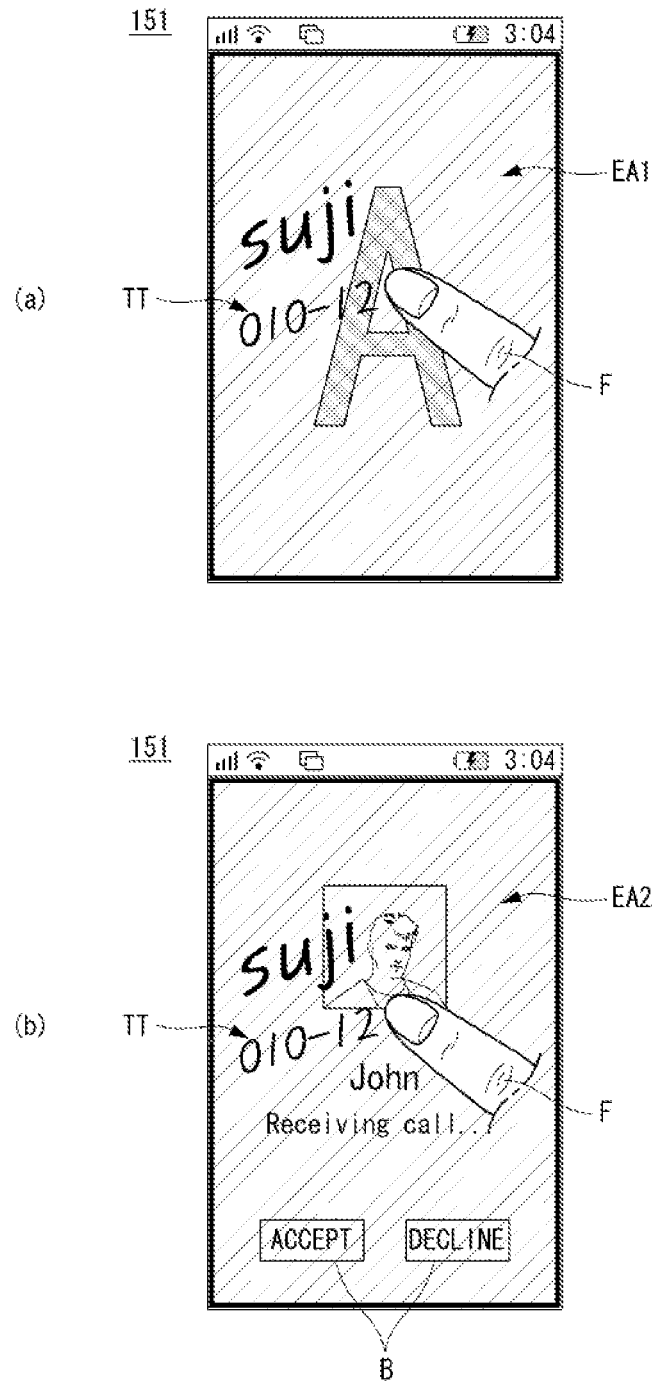
FIGS. 38 to 40 illustrate an operation of receiving a call during execution of the note function.
Figure 39:
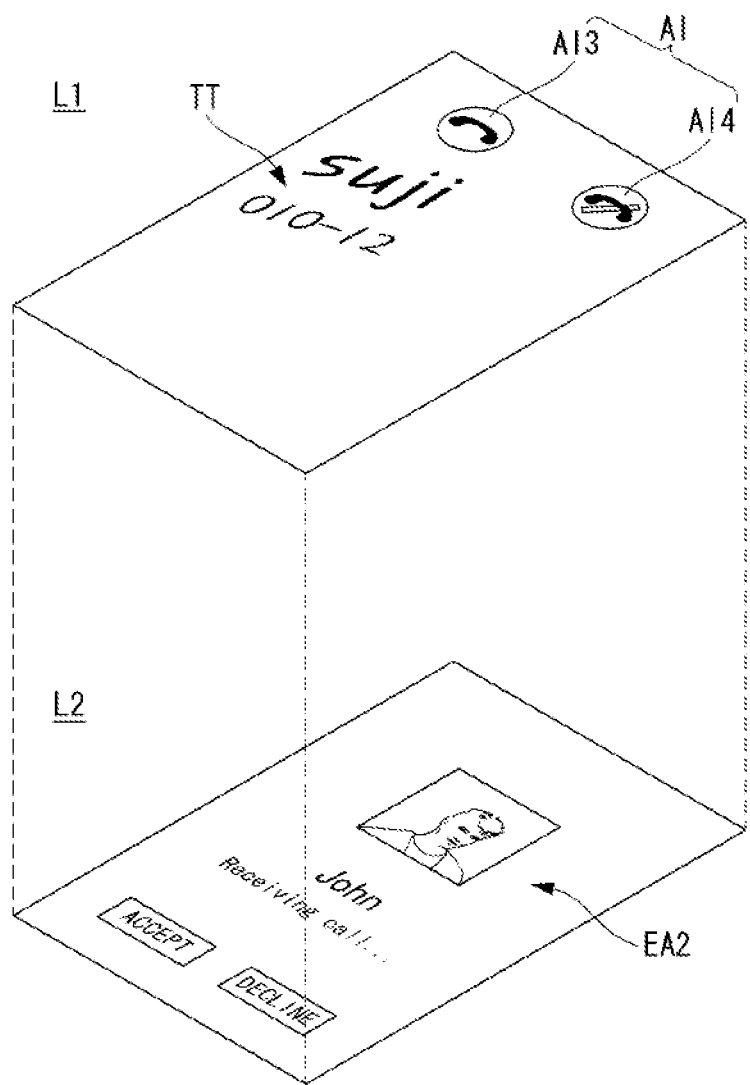
Figure 40:
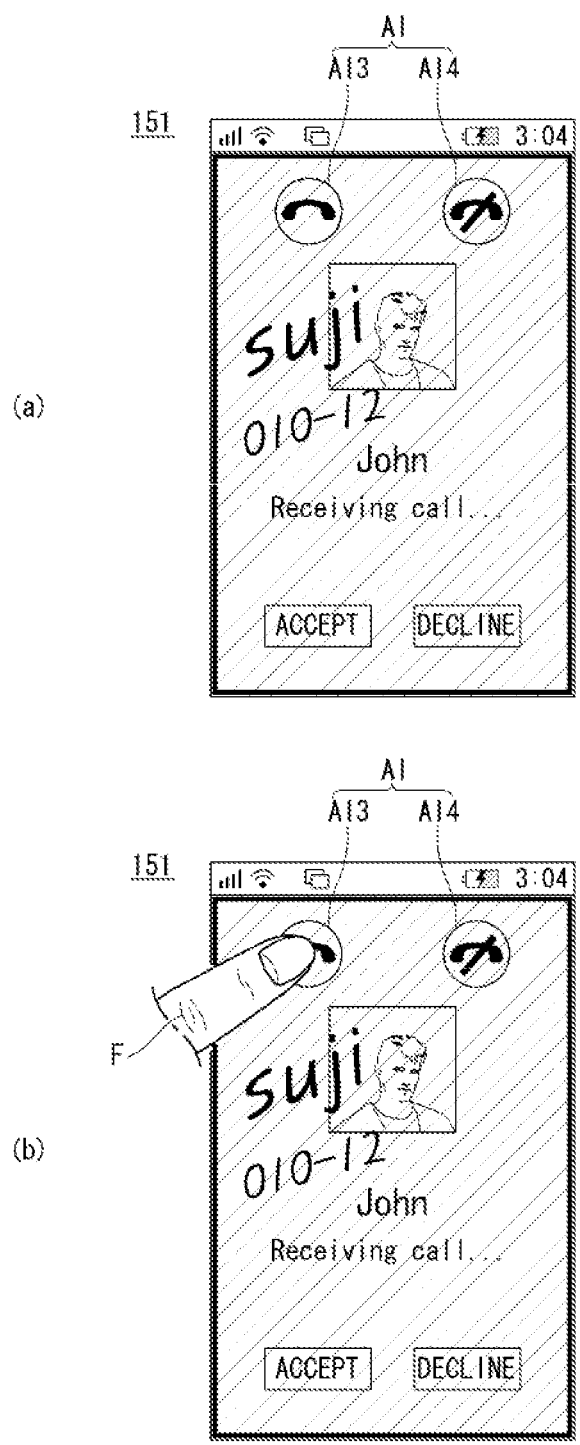

FIGS. 38 to 40 illustrate an operation of receiving a call while the note function is executed.

As shown in FIGS. 38 to 40, the controller 180 of the mobile terminal 100 can execute the note function even when a call is received during execution of the note function by providing high priority to the note function.

Referring to FIG. 38(a), the user may input a note using the finger F while a first execution application EA1 is executed. The note input by the user can be displayed as a touch trajectory TT on the display 151.

Referring to FIG. 38(b), a second execution application EA2 may be executed while the user inputs the note. The second execution application EA2 may be an application signaling reception of a call. That is, the second execution application EA2 can signal a call from a specific caller. The second execution application EA2 can display selection buttons B by which a call can be accepted and declined.

Referring to FIG. 39, information about a receiving call according to the execution application EA2 may be displayed on the first layer S1 and the touch trajectory TT corresponding to the touch input of the user may be displayed on the second layer S2. When the call is received, the controller 180 can display function icons AI on the second layer S2, separately from the selection buttons B displayed on the first layer S1. The function icons AI may include a call accept icon AI3 and a call decline icon AI4. Upon selection of the call accept icon AI3 or call decline icon AI4, the controller 180 can execute a function corresponding to the selected function icon.

Referring to FIG. 40(a), a screen indicating the receiving call may be displayed with the function icons AI on the display 151.

Referring to FIG. 40(b), the user can select a specific icon from the function icons AI and execute a function corresponding to the selected icon. The user may not want to stop the quick note function when an event such as call reception is generated. For example, the user may miss the timing of inputting a desired note if the note function is ended or interrupted due to a receiving call, and thus the user may want to continuously use the quick note function even if a cell is received. In addition, the selection buttons B included in the second execution application EA2 that signals a receiving call can be prevented from being erroneously selected by a touch operation for writing a note by separately displaying the function icon AI by which whether a receiving call is accepted or declined can be checked.

FIGS. 41 to 47 illustrate a case in which the note function is used while an image is captured.

As shown in FIGS. 41 to 47, the controller 180 of the mobile terminal 100 can add a note to a captured image. Accordingly, the captured image can be effectively managed.

Figure 41:
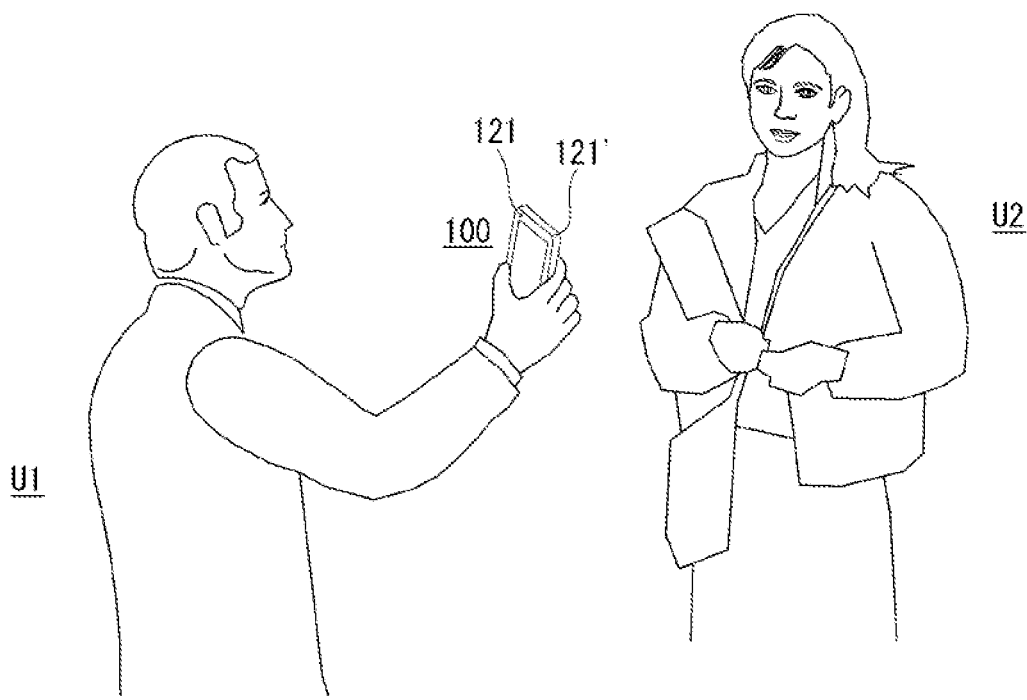

Referring to FIG. 41, a first user U1 can take a picture of a second user U2 using the camera 121' of the mobile terminal 100.

Figure 42:
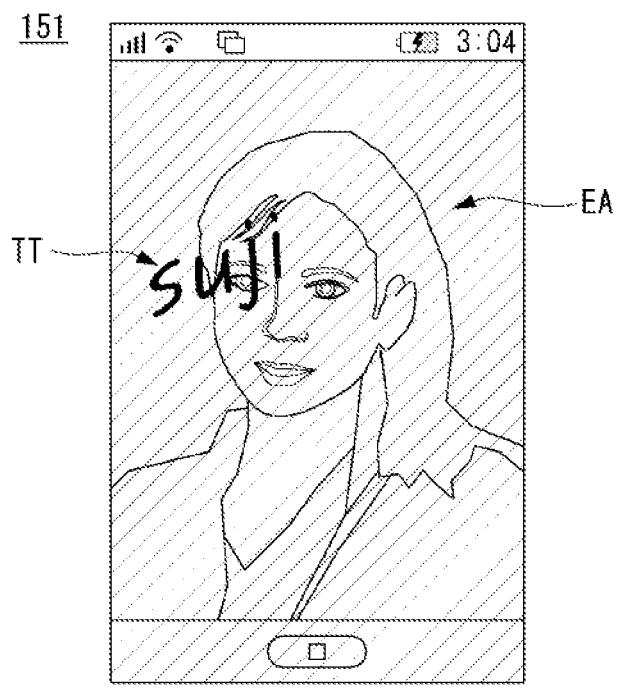

Referring to FIG. 42, the image of the second user U2, which is being captured by the mobile terminal 100, may be displayed on the display 151 according to an execution application EA. The first user U1 can touch the image of the second user U2 to add a touch trajectory TT to the image. For example, the user can write the name of the second user U2 on the image of the second user U2.

Figure 43:
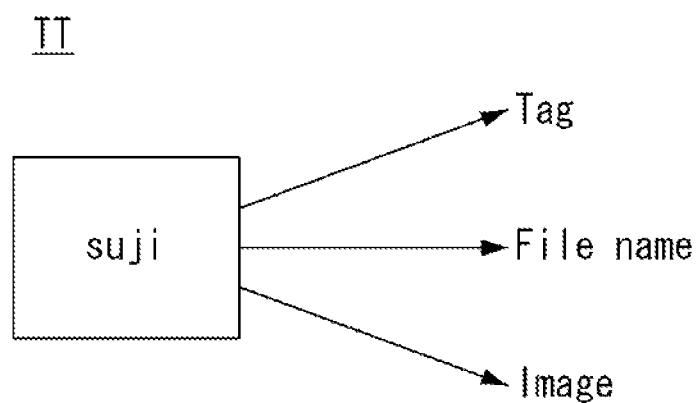
Figure 45:
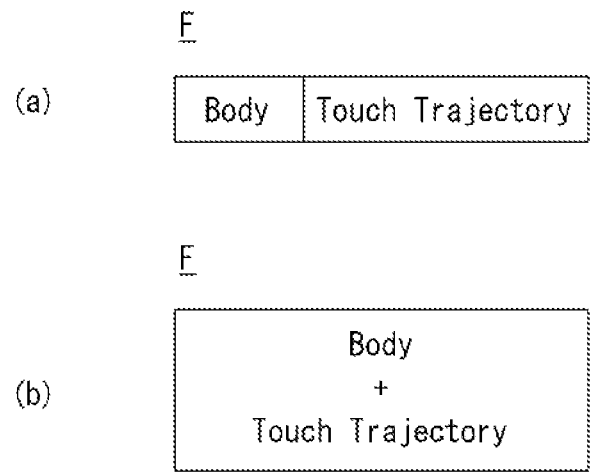

Referring to FIG. 43, the touch trajectory TT input by the user can be used for various purposes.

The touch trajectory TT may be added to an image file as a tag. That is, the touch trajectory TT can be used as information that can be added to the image file. When the touch trajectory TT corresponds to the name of the person who is being photographed, the touch trajectory TI can be used in such a manner that an image of the specific person is found by searching tags.

The touch trajectory TT may be used as a file name. Specifically, the touch trajectory TT can be used as a name of a stored image file. In this case, the user can rapidly recognize how the image file is generated because letters corresponding to the touch trajectory TT input by the user, instead of an automatically generated serial number, are used as the file name.

The touch trajectory TT may be stored as an image. Specifically, the touch trajectory TT can be stored with the image captured by the camera 121' of the mobile terminal 100. Here, the touch trajectory TT can be stored separately from the captured image or stored with the captured image.

Referring to FIG. 44(a), an image file F may include a body corresponding to a captured image and a tag. The tag may correspond to the contents of the touch trajectory TT input by the user.

Referring to FIG. 44(b), the tag may include information about the image file F, such as photographing date, etc. In addition, the tag may include the contents of the touch trajectory TT input by the user. Accordingly, it is possible to effectively search information included in the image file F on the basis of the information of the tag.

Referring to FIG. 45(a), the image file F may include the body corresponding to image data and a touch trajectory. The touch trajectory may be stored as the image thereof. The touch trajectory is stored separately from the captured image, and thus only the captured image can be displayed or the touch trajectory can be superimposed on the captured image.

Referring to FIG. 45(b), the image file F may be stored such that the body corresponding to the image data and the touch trajectory are stored as one body. That is, the touch trajectory input by the user and the captured image can be stored as one body.

Figure 46:
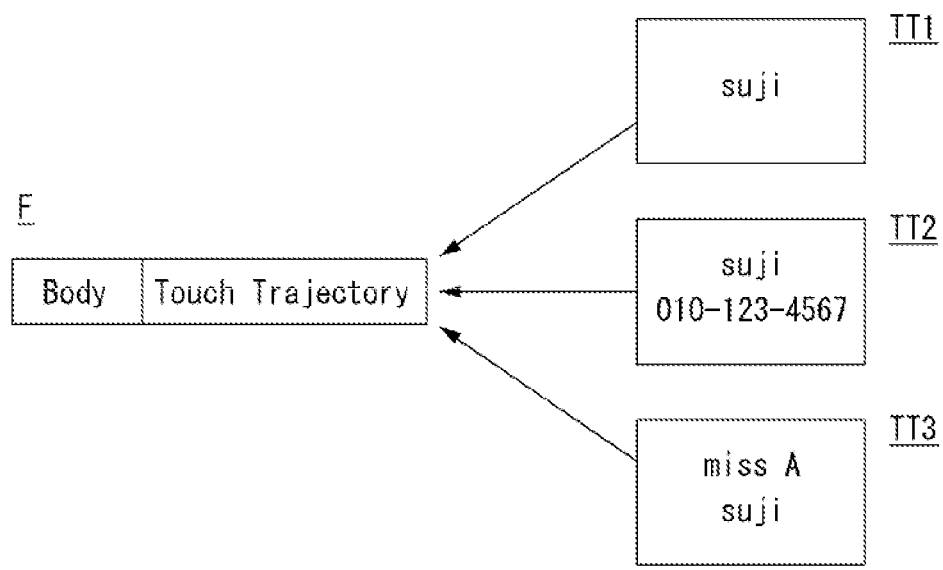
Figure 47:
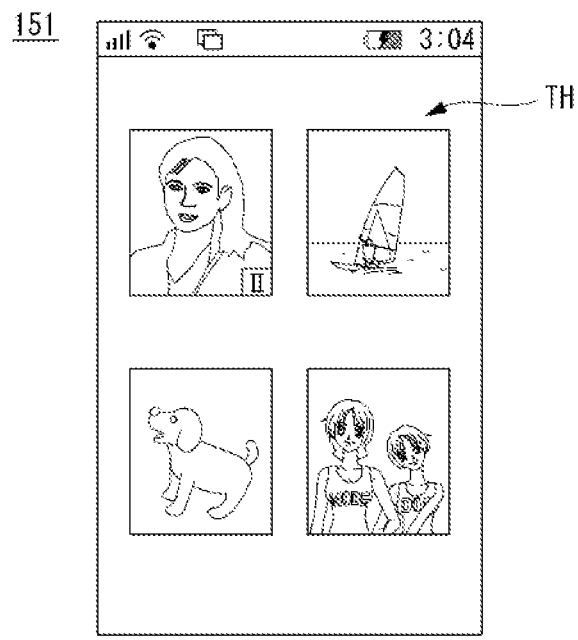
Figure 47:
Figure 47:
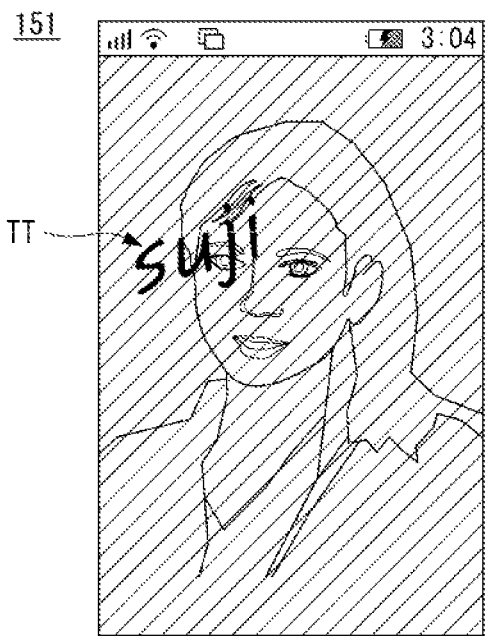

Referring to FIG. 46, when the image file F includes the body and the touch trajectory, the touch trajectory may be corrected after storage. For example, it is possible to initially input a first touch trajectory TT1 corresponding to the name, input a second touch trajectory TT2 including a phone number at a specific time, and then input a third touch trajectory TT3 including related information at a specific time. This operation can be performed by separately storing the body, that is, captured image, from the touch trajectory.

Referring to FIG. 47(a), the controller 180 may add a specific indicator to an image file including a note. For example, when images are displayed as thumbnails TH, an indicator icon I1 can be added to the image including the note input by touch of the user.

Referring to FIGS. 47(b) and 47(c), the controller 180 can display only the captured image or superimpose the touch trajectory TT on the captured image according to selection of the user and/or a control signal of the controller 180.

Figure 48:
FIG. 48 illustrates an operation structure of the mobile terminal of FIG. 1.
Figure 48:
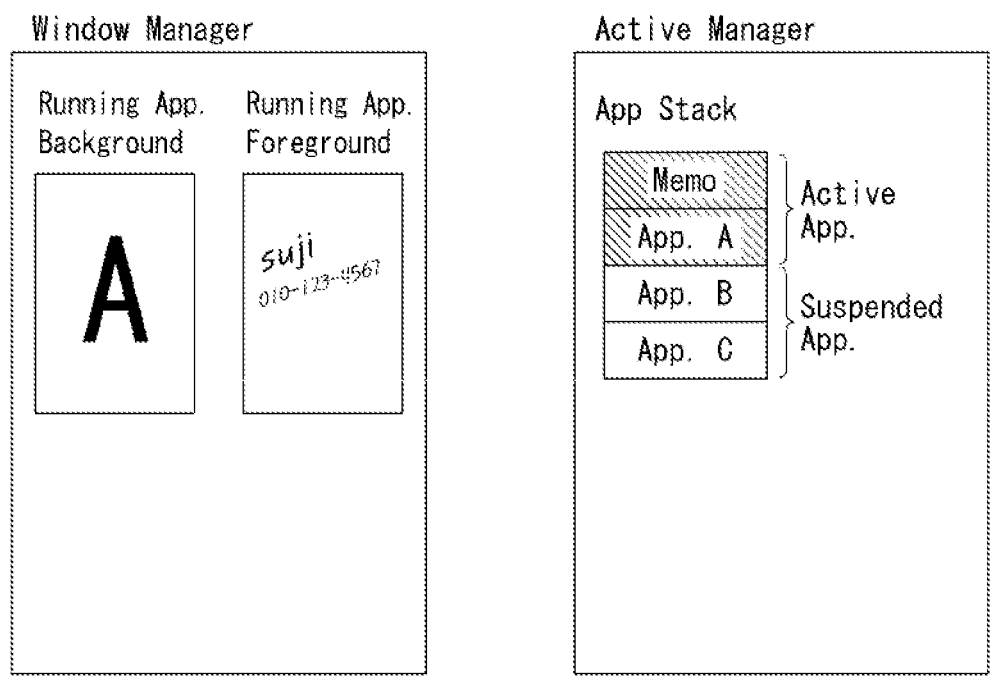

FIG. 48 illustrates an operation structure of the mobile terminal shown in FIG. 1.

As shown in FIG. 48, the controller 180 of the mobile terminal 100 can simultaneously enable a plurality of application stacks to display a plurality of screens.

The controller 180 can construct a framework. The framework may include a window manager and an active manger.

The window manager may configure applications displayed on the display 151. For example, the window manger can allocate memory to an application to be executed on the background and an application to be executed on the foreground.

The active manager can control activation of a specific application. For example, if a note application, application A, application B and application C are configured, the active manager can determine an application to be enabled from among the applications. When application B is selected according to screen change by an operation of the user, the active manager can change application A to a waiting state and change application B to an enabled state. Even in this case, the note application can be kept in an enabled state all the time. Accordingly, the display of the note input by the user on the display 151 can be maintained.

The controller 180 of the mobile terminal 100 can simultaneously enable a plurality of applications. That is, the controller 180 can additionally enable the note application for quick memo when application A is being displayed on the display 151. This is distinguished from the conventional technique of activating applications one by one. Accordingly, display of the note input by the user can be maintained.

The above-described method of controlling the mobile terminal may be written as computer programs and may be implemented in digital microprocessors that execute the programs using a computer readable recording medium. The method of controlling the mobile terminal may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device that can store data that can be thereafter read by a computer system. Examples of the computer readable recording medium may include read-only memory (ROM), random-access memory (RAM), CD-ROMs, DVD±ROM, DVD-RAM, magnetic tapes, floppy disks, optical data storage devices. The computer readable recording medium may also be distributed over network coupled computer systems so that the computer readable code is stored and executed in a distribution fashion.

A mobile terminal may include a first touch screen configured to display a first object, a second touch screen configured to display a second object, and a controller configured to receive a first touch input applied to the first object and to link the first object to a function corresponding to the second object when receiving a second touch input applied to the second object while the first touch input is maintained.

A method may be provided of controlling a mobile terminal that includes displaying a first object on the first touch screen, displaying a second object on the second touch screen, receiving a first touch input applied to the first object, and linking the first object to a function corresponding to the second object when a second touch input applied to the second object is received while the first touch input is maintained.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
   a touch screen;
   a camera configured to acquire an image; and
   a controller configured to:
   display the acquired image and a menu icon for enabling a note function on the touch screen, wherein the menu icon is displayed on a status bar provided on a top end of the touch screen before the image is acquired through the camera;
   enable the note function on the touch screen in response to a selection of the menu icon while the acquired image is displayed;
   receive a touch input for performing the note function on the image, a touch trajectory corresponding to the touch input being displayed on the image as a note; and
   store the note on the acquired image in a memory of the mobile terminal,
   wherein the note is stored as a file name of the acquired image in the memory.

2. The mobile terminal of claim 1, wherein the controller is configured to display at least one icon for editing on the touch screen.

3. The mobile terminal of claim 1, wherein the note function is further enabled in response to a predetermined input, the predetermined input comprising at least one of a touch input applied on a random point of the acquired image, a touch input to a specific soft key or indicator displayed on the touch screen, or an input through a specific hard key button on the mobile button.

4. The mobile terminal of claim 1, wherein the controller is configured to display the acquired image on the touch screen according to an executing application for displaying the acquired image.

5. The mobile terminal of claim 1, wherein the note is stored separately from the acquired image or stored with the acquired image.

6. The mobile terminal of claim 1, wherein the acquired image comprises a preview image displayed on the touch screen according to an executing camera application.

7. A method of controlling a mobile terminal, the method comprising:
   acquiring, via a camera of the mobile terminal, an image;
   displaying the acquired image and a menu icon for enabling a note function on the touch screen of the mobile terminal, wherein the menu icon is displayed on a status bar provided on a top end of the touch screen;
   enabling the note function on the touch screen in response to a selection of the menu icon while the acquired image is displayed;
   receiving a touch input for performing the note function on the image, a touch trajectory corresponding to the touch input being displayed on the image as a note; and
   storing the note on the acquired image in a memory of the mobile terminal,
   wherein the note is stored as a file name of the acquired image in the memory.

8. The method of claim 7, further comprising:
   displaying at least one icon for editing on the touch screen.

9. The method of claim 7, wherein the note function is further enabled in response to a predetermined input, the predetermined input comprising at least one of a touch input applied on a random point of the acquired image, a touch input to a specific soft key or indicator displayed on the touch screen, or an input through a specific hard key button on the mobile button.

10. The method terminal of claim 7, wherein the displaying the acquired image on the touch screen comprises:
   displaying the acquired image on the touch screen according to an executing application for displaying the acquired image.

11. The method terminal of claim 7, wherein the storing the note on the captured image comprises storing the note separately from the acquired image or storing the note with the acquired image.

* * * * *